(12) United States Patent
Li et al.

(10) Patent No.: US 11,796,394 B2
(45) Date of Patent: Oct. 24, 2023

(54) AUTOMATIC MULTICHANNEL APPARATUS FOR ASSESSING HOT COAL FALLOUT PROPENSITY OF BURNING CIGARETTES AND ASSESSING METHOD THEREOF

(71) Applicants: ZHENGZHOU TOBACCO RESEARCH INSTITUTE OF CNTC, Zhengzhou (CN); HEFEI INSTITUTE OF PHYSICAL SCIENCE, CHINESE ACADEMY OF SCIENCES, Hefei (CN); CHINA TOBACCO JIANGXI INDUSTRIAL CO., LTD., Nanchang (CN)

(72) Inventors: Bin Li, Zhengzhou (CN); Yi Zhang, Nanchang (CN); Yong Liu, Hefei (CN); Mingjian Zhang, Zhengzhou (CN); Long Zhang, Hefei (CN); Yaoshuo Sang, Hefei (CN); Liu Hong, Nanchang (CN); Zhigang Li, Hefei (CN); Min Ji, Hefei (CN); Zhenyu Xu, Nanchang (CN); Xiaoping Liu, Zhengzhou (CN); Bing Wang, Zhengzhou (CN)

(73) Assignees: ZHENGZHOU TOBACCO RESEARCH INSTITUTE OF CNTC, Zhengzhou (CN); HEFEI INSTITUTE OF PHYSICAL SCIENCE, CHINESE ACADEMY OF SCIENCES, Hefei (CN)

(\*) Notice: Subject to any disclaimer, the term of this patent is extended or adjusted under 35 U.S.C. 154(b) by 722 days.

(21) Appl. No.: 16/959,095

(22) PCT Filed: Dec. 26, 2018

(86) PCT No.: PCT/CN2018/123773
§ 371 (c)(1),
(2) Date: Jun. 29, 2020

(87) PCT Pub. No.: WO2019/129028
PCT Pub. Date: Jul. 4, 2019

(65) Prior Publication Data
US 2020/0333366 A1    Oct. 22, 2020

(30) Foreign Application Priority Data
Dec. 29, 2017 (CN) .......................... 201711469802.7

(51) Int. Cl.
*G01J 5/00* (2022.01)
*A24C 5/34* (2006.01)
(Continued)

(52) U.S. Cl.
CPC .......... *G01J 5/0014* (2013.01); *A24C 5/3406* (2013.01); *G01K 13/12* (2013.01); *G01N 1/2205* (2013.01); *G01J 5/0022* (2013.01)

(58) Field of Classification Search
CPC ...................................................... A24C 5/34
See application file for complete search history.

(56) References Cited

U.S. PATENT DOCUMENTS

| 4,333,333 | A | * | 6/1982 | Pangritz | ................ G01N 25/50 |
| | | | | | 374/57 |
| 2016/0113321 | A1 | * | 4/2016 | Verbeeck | ................ A24F 40/80 |
| | | | | | 73/23.31 |
| 2018/0140002 | A1 | * | 5/2018 | Ademe | ................ A24F 19/0035 |

FOREIGN PATENT DOCUMENTS

| CN | 104489917 A | 4/2015 |
| CN | 105651626 A | 8/2016 |

(Continued)

OTHER PUBLICATIONS

International Search Report Issued in PCT/CN2018/123773, dated Mar. 28, 2019, 3 pages.

*Primary Examiner* — Philip Y Louie

*Assistant Examiner* — Miles A Simpson
(74) *Attorney, Agent, or Firm* — Lewis Roca Rothgerber Christie LLP

(57) ABSTRACT

The present disclosure has provided an automatic multichannel apparatus for assessing hot coal fallout propensity of burning cigarettes and an assessing method thereof. The apparatus comprises a multichannel rotary plate unit, an automatic supplying unit for cigarette samples, an automatic ignition and burning line detection unit for cigarette samples, a cigarette holding and force applying unit, an automatic hot coal fallout detection and removal unit, a smoke collecting unit during suction, a suction unit, a gas exhaust unit arranged in a main frame, and an electric circuit and air path control unit for controlling actions and processes of the above units. The apparatus operates based on certain steps and performs automatic ignition and burning line detection on cigarette samples inserted into a rotary plate in sequence. A controllable external force is applied to the cigarettes during burning and suction, and hot coal fallout propensity of this kind of cigarette is detected by hot coal fallout occurrence of multiple cigarettes. The apparatus according to the present disclosure can improve test repeatability and working efficiency.

54 Claims, 14 Drawing Sheets

(51) Int. Cl.
  *G01K 13/12* (2006.01)
  *G01N 1/22* (2006.01)

(56) References Cited

FOREIGN PATENT DOCUMENTS

| | | |
|---|---|---|
| CN | 106124260 A | 11/2016 |
| CN | 108037300 A | 5/2018 |
| CN | 207742211 U | 8/2018 |
| JP | H08159892 A | 6/1996 |
| KR | 101731465 B1 | 4/2017 |

* cited by examiner

AUTOMATIC MULTICHANNEL APPARATUS FOR ASSESSING HOT COAL FALLOUT PROPENSITY OF BURNING CIGARETTES AND ASSESSING METHOD THEREOF

CROSS-REFERENCE TO RELATED APPLICATION(S)

The present application is a U.S. National Phase Patent Application and claims priority to and the benefit of International Application Number PCT/CN2018/123773, filed on Dec. 26, 2018, which claims priority to and the benefit of Chinese Patent Application No. 201711469802.7 filed on Dec. 29, 2017 in the State Intellectual Property Office of China, the disclosures of which are incorporated herein by reference, in their entirety.

FIELD

The present application belongs to the technical field of quality detection of cigarette products, and particularly relates to an automatic multichannel apparatus for assessing hot coal fallout propensity of burning cigarettes and an assessing method thereof. The apparatus applies a controllable external force to a burning cigarette according to certain steps. The method for assessing hot coal fallout propensity of such burning cigarettes can be evaluated by occurrence of hot coal fallout phenomenon of multiple cigarettes.

BACKGROUND

During the process of cigarette consumption, hot coal fallout phenomenon of burning cigarettes has occurred frequently, which greatly affects consumer's acceptance of cigarette products and the brand thereof. Furthermore, harm caused by such hot coal fallout is increasingly complained by consumers. On one hand, the hot coal fallout of burning cigarettes may cause cigarette loss to interrupt smoking, and if falling butts are fallen on flammable positions (for example, furniture, clothing, wild jungle, etc.), thereby causing risk of fire (Peace. World No Tobacco Day: Interpretation of fire accidents caused by cigarette butt [J]. China Fire, 2011 (11): 38-42.). Enterprises for processing and manufacturing cigarettes have paid more attention to occurrence of this phenomenon. The problem how to improve and assess performance of hot coal fallout of burning cigarettes becomes hot issues to be solved urgently for those cigarette enterprises (WANG Haibin, LiU Dehu, W U Zhaogang, et al. Analysis and research on falling phenomenon of cigarette burning end [A]. China Tobacco Society 2010 Symposium Set, 2010, 285-287).

Hot coal fallout of burning cigarettes may be caused by many reasons. From the point of cigarette design and processing, hot coal fallout of burning cigarettes may be caused by filling state of cut tobacco in cigarette paper, mismatching of burning rate during combustion and insufficient encapsulation of formed ash and other reasons. However, assessment of hot coal fallout propensity of burning cigarettes during smoking is a basis for improving the performance thereof. Mostly, assessment of this performance depends on evaluator's sensuous or conscious evaluation, leading to great human influence, low efficiency for obtained data and poor repeatability. Meanwhile, development of apparatus for assessing hot coal fallout propensity of burning cigarettes also becomes a hot issue in this technical field.

Chinese invention patent "Hot Coal Fallout Detection Device for Burning Cigarettes" (CN 102937639 A) has designed a force applying device, which can observe occurrence of hot coal fallout of burning cigarettes by applying tapping action on a smoking cigarette during cigarette smoking and tapping process. The difference between the tapping mode of the device and actual consumer's habit of flicking action is not described, and test results of this method are too simple to give effective and objective evaluation.

A hot coal fallout detecting device for burning cigarettes involved in Chinese utility model patent "Hot Coal Fallout Detecting Device for Burning Cigarettes" (CN 204165850 U) has improved problems in that the device disclosed in Chinese patent application "Hot Coal Fallout Detection Device for Burning Cigarettes" (CN 102937639 A) cannot flexibly change tapping force and angle, but there are still some issues. The tapping method disclosed in the patent still relies on external mechanical force to strike cigarettes. Such tapping simulation may be superficially performed by mechanical components through surface tapping action, but actual stress situation in the process may be not considered in nature while achieving means of automatic operation may not be considered either.

Chinese patent application (201310227468.X) has disclosed "Device for Detecting Hot Coal Fallout Propensity of Burning Cigarettes by Rotation". The device may comprise a base, a motor, a cigarette holding mechanism driven by the motor, and a safety shield. This disclosure tests hot coal fallout phenomenon of burning cigarettes by rotation, which has developed a new method for detecting hot coal. This new method obtains statistical data of hot coal fallout by multiple detections, thereby obtaining performance index of hot coal fallout propensity of burning cigarettes. The present disclosure has technical effects in that rotation time and number of revolutions are controllable, different detection strengths can be applied on different samples, and a wide range of application can be obtained; the detection method is simple and convenient, spends short time, and has low detection cost. However, since there is no actual smoking process in this method, it does not meet the human behavior of tapping ashes and flicking ashes, and there is still a problem in evaluating hot coal fallout performance of burning cigarettes in actual situation.

Chinese patent application (201510973214.1) provides "Automatic Control Detection Device and Method for Hot Coal Fallout Performance of Burning Cigarettes". The device and method are designed by studying comparison of mechanical behavior between machine flicking ash and human flicking ash so as to ensure mechanical dynamics behavior caused by flicking ash through a mechanical device to be consistent with human dynamics behavior. This may provide a unified, objective and accurate detection method for hot coal fallout propensity detection of cigarettes. But this method has not yet described how to establish a cigarette hot coal fallout propensity detection method based on behavior features of consumer's action of flicking cigarette ash. However, such falling behavior features are basic issue of the proposed and applied method for cigarette hot coal fallout performance evaluation, and it is more important to establish a simulated detecting method based on behavior features of human action of flicking cigarette ash. Meanwhile, this method does not involve how to load cigarettes, how to release cigarettes after testing and how to ensure that effects caused by human operation are reduced during the testing.

Chinese invention patent "Method for Assessing Hot Coal Fallout Propensity of Burning Cigarettes Based on Human Behavior Features of Ash-flicking Action" (201710303000.2) and Chinese invention patent "Method for Assessing Hot Coal Fallout Propensity of Burning Cigarettes Based on Human Behavior Features of Ash-tapping Action" (201710302981.9) have respectively invented the methods for assessing hot coal fallout propensity of burning cigarettes based on the behavior features of simulation for human ash-flicking and ash-tapping actions. The inventions define reasonable steps and notices during cigarette testing based on both simulated human behavior features of ash-flicking mode and ash-tapping mode, which are helpful to improve operation specification and repeatability of the test data. However, none of these two patents involve how to implement and ensure elimination of the effects caused by human operations during the testing.

Above patents have made great progress in realization of a device for assessing hot coal fallout propensity of burning cigarettes (simulating human ash-tapping and ash-flicking actions, abstract rotation test, tapping force of a mechanical arm, etc.), methods (based on human behavior or not based on human behavior), and automation (how to organize each force applied component), which make detection of hot coal fallout propensity of burning cigarettes to be possible. However, the prior art does not fully consider how to load cigarettes (manual or automatic) during the cigarette testing, testing of single cigarette, whether ambient atmosphere flow of the testing environment conforms to international standard smoking process, and so on. Many of the above inventions cannot achieve goals of improving work efficiency and reducing influence on human operation because the testing needs to be repeated for many times and the testing procedure needs to be adjusted according to the testing.

SUMMARY

An object of the present disclosure is to solve above problems. The present disclosure provides an automatic multichannel apparatus for assessing hot coal fallout propensity of burning cigarettes and an assessing method thereof based on consumer behavior features of flicking cigarette ash, to realize test for multiple cigarettes. This can overcome the problems of current automatic loading of cigarette samples during the test and whether the test for a single sample and surrounding atmosphere flow of the test environment conform to the international standards and so on. Therefore, the present disclosure can improve test repeatability and work efficiency.

The object of the present disclosure is achieved by following technical solutions:

A multichannel rotary plate unit (1) may comprise a multichannel rotary plate (106), a securing plate (107), a first pneumatic joint (115) disposed on the securing plate, a transmission seat (108), a support seat (109), a transmission seat base (114), a stepper motor (111) and a coding plate (110) for positioning and a photoelectric switch for detecting position. A rotary plate flange (103) is installed on the transmission seat (108). A plurality of sample insertion holes are provided around the circumference of the multichannel rotary plate (106). The rotary plate (106) is mounted on the rotary plate flange (103) via a flange press knob (104). The multichannel rotary plate (106) and the securing plate (107) are closely attached together and a sealing structure is provided between the pneumatic joint (115) and the sample insertion holes. When the multichannel rotary plate (106) drives a sample inserted in the sample insertion hole to rotate to a position of the first pneumatic joint and being coaxial with the first pneumatic joint, a suction channel is connected. The coding plate (110) and the photoelectric switch (112) for detecting position are installed on the support seat (109). The multichannel rotary plate (106) rotates by starting the stepper motor (111), and a rotation angle of the stepper motor is controlled by the coding plate (110) and the photoelectric switch (112) for detecting position.

The automatic supplying unit (3) for cigarette sample may comprise a cigarette loading module and a cigarette pushing module arranged on a cigarette loading base (301); the cigarette loading module may include a cigarette collection box (315), a front bracket (317) and a rear bracket (312) of the cigarette collection box, a sample supplying roller (313) provided at bottom of the cigarette collection box, a roller motor (310), a cigarette sliding slot (314) provided on the cigarette loading base and located below the sample supplying roller. A cigarette supplying guide plate (330) is provided between the sample supplying roller (313) and the cigarette sliding slot (314). A correlation photoelectric switch a (316) and a correlation photoelectric switch b (331) are provided on both sides of the cigarette sliding slot to detect whether a sample is loaded into the cigarette sliding slot (314). The roller motor (310) and the sample supplying roller (313) are connected by a roller coupler (324), and a coding plate (328) of the cigarette loading roller is installed on a shaft of the sample supplying roller. The cigarette pushing module may include a cigarette pushing motor (309), a cigarette pushing lead screw platform installation seat (303), a cigarette pushing lead screw platform (326) and a pushing rod (327) provided on the installation seat (303), and a transverse cylinder (323) arranged in parallel with the cigarette pushing lead screw platform (326) side by side. A claw cylinder (318) and a cigarette loading claw (320) are installed at a front end of the transverse cylinder by a claw installation seat (319). The transverse cylinder (323) is fixed on the cigarette loading base (301) by a cylinder installation seat (302). The pushing rod (327) is located above the cigarette sliding slot and disposed co-axially with a cigarette sample within the cigarette sliding slot, and may push the sample within the cigarette sliding slot (314) onto a sample bracket (322). The claw cylinder (318) drives the cigarette loading claw (320) to tightly hold the sample. The transverse cylinder (323) drives the claw installation seat (319) to move forth and back such that the sample is delivered to a set position, that is, interior of the sample insertion holes in the multichannel rotation plate unit (1).

An automatic ignition and burning line detection unit (4) for cigarette samples may comprise a bottom plate (404) of the cigarette ignition and burning line detection unit, an automatic cigarette ignition module and a burning line detection module provided on the bottom plate (404). The automatic cigarette ignition module may be composed of a motor (412), an igniter electric platform (409), igniter support seats (416, 406) and an igniter head (418). The igniter head (418) moves forth and back under drive of a lead screw of the igniter electric platform through the igniter support seats. The burning line detection module may be composed of a burning line detection movable platform (419), a burning line detection adapter (401) provided on the burning line detection movable platform, a probe shaft (421), a probe piece (422) and a burning line detection temperature sensor (402). The probe shaft is co-axial with the burning line detection temperature sensor. An axis of the igniter head (418) and an axis of the probe shaft (421) are located on a same horizontal plane and perpendicular to each other.

A cigarette holding and force applying unit (5) may comprise a base (513) of the holding and force applying unit, a pneumatic sliding table of a flicking assembly (514) provided on the base, a motor sliding table installation plate (511) fixed on the pneumatic sliding table of the flicking assembly (514), and an auxiliary holding module and a force applying and flicking module installed on the motor sliding table installation plate (511). The auxiliary holding module may comprise a one-dimensional motor sliding table (512) of the holding module, a motor sliding table base (510), and a flicking claw support seat (507) driven by the one-dimensional motor sliding table and a flicking claw mechanism connected on the claw support seat. A limit photoelectric switch (509) is provided on the motor sliding table base (510), and a limit baffle (508) is provided on the claw support seat (507). The auxiliary holding module functions to tightly clamp a cigarette sample, on which a force is applied. Meanwhile, the clamping position can be adjusted by the claw limit baffle (508), the limit photoelectric switch (509) and the one-dimensional motor sliding table (512) of the holding module. The force applying module may comprise a lead screw sliding table (515) driven by a motor, a flicking module installation seat (518) mounted on the lead screw sliding table, a pneumatic sliding table (519) of the flicking module provided on the flicking module installation seat (518), a rotary cylinder (506) installed on the pneumatic sliding table (519) of the flicking module, and a flicking sheet (502) and a flicking head (501) controlled by the rotary cylinder. The force applying flicking module functions to flick the clamped cigarette sample, and to apply a flicking force to the cigarette and adjust strength and duration of the flicking force by a combined motion of the rotary cylinder (506) and the pneumatic sliding table of the flicking module (519). Meanwhile, adjustment of the flicking position is accomplished by a null photoelectric switch (516), a null switch baffle (517) provided on the flicking module installation seat (518) and the lead screw sliding table of a flicking module (515).

An automatic hot coal fallout detection and removal unit (2) may comprise a hot coal fallout unit base (213), and a hot coal fallout determination module and a cigarette removable module installed side by side on the base. The hot coal fallout determination module may include an adaptor (208), a probe base (212) provided on the adapter, a probe guide tube (209) installed on the probe base, and a hot coal fallout detection temperature sensor (211) disposed in the adapter (208) and located at a rear end of the probe guide tube and coaxial therewith. The cigarette removal module may include a cylinder installation seat (203), a cigarette pull cylinder (204) provided on the cylinder installation seat, and two guide shafts (201), a pneumatic finger connection plate (205), cigarette pulling fingers (207) and a cigarette pull claw (206) connected at a lower end of the cigarette pull fingers, wherein the two guide shafts, the pneumatic finger connection plate, the cigarette pull fingers and the cigarette pull claw are located on both sides of the cigarette pull cylinder. The probe guide tube (209) is arranged in parallel with a moving direction of the cigarette pull cylinder, and the cigarette pull claw (206) is located on an axis extension line directly in front of the probe guide tube (209).

A smoke collecting unit (6) may comprise a trap compression cylinder (608), a pressing rod installation seat (607), a trap module, a smoke collecting unit installation seat (601), a compression cylinder bracket (606) and a second pneumatic joint (610) and a gas discharge joint (615). The compression cylinder bracket (606) is fixed on the smoke collecting unit installation seat (601) via a corner element (602). The trap compression cylinder (608) is fixed on the pressing rod installation seat (607). A rear end of the second pneumatic joint (610) fixed on the trap compression cylinder is connected with the first pneumatic joint (115) in the multichannel rotation plate unit (1). The gas discharge joint (615) is fixed on the smoke collecting unit installation seat (601), and the other end of the gas discharge joint is connected to the suction unit. The collecting unit is used to collect the gas generated by smoking the cigarette within each channel of the multichannel rotation plate unit (1) and filter impurities within the gas.

The suction unit may comprise a suction cylinder, a motor, and a slide rail seat disposed on the base. A movable block connected with the motor shaft is installed on the slide rail seat. The piston is driven by the motor to perform a suction action. The base and a suction motor bracket are fixed on a suction unit support rod.

An electric circuit and an air path control unit may send an instruction to a solenoid valve. The instruction is sent in a time series. The solenoid valve controls a pneumatic executor to perform related operations. The control unit sends an instruction to the motor, and the electric executor is controlled by the motor to perform related operations.

In the multichannel rotation plate unit (1), a sealing structure is provided on the rotary plate (106), and includes a labyrinth ring sleeve (101), a labyrinth ring (118), a labyrinth ring connection seat (117) and a Variseal (116). The Variseal is located at a position where the rotary plate and the securing plate are attached together. The labyrinth ring sleeve, the labyrinth ring, and the labyrinth ring connection seat are arranged in the sample insertion holes of the rotary plate, thereby forming seal of the suction channels. A handle is installed on a surface of the rotary plate so as to facilitate removing, cleaning and installation of the rotary plate.

In the multichannel rotation plate unit (the stepper motor (111) and the rotary plate flange (103) are connected by bolts, and the rotary plate flange (103) and the rotary plate (106) are connected by the flange press knob (104).

In the automatic hot coal fallout detection and removal unit (2), the two guide shafts (201) are arranged on the cylinder installation seat (203) by a linear bearing (202), and symmetrically disposed on both sides of the cigarette pull cylinder (204).

In the automatic ignition and burning line detection unit (4) for cigarette samples, a lateral securing seat (408) connected with other associated equipments is provided on one side of the unit bottom plate (404). An igniter photoelectric switch (405) is provided on the lateral securing seat (408). An igniter electric platform (409) is fixed on the lateral securing seat (408). An igniter photoelectric switch baffle (407) is arranged on the igniter electric platform (409), and the baffle (407) cooperates with the photoelectric switch (405) so that the igniter head (418) can run to the initial position every time, thereby achieving the setting of ignition positions of cigarettes having different lengths.

In the automatic supplying unit (3) for cigarette samples, a cigarette pushing baffle (325) is provided on the cigarette pushing lead screw platform (326) via a cigarette pushing baffle installation seat (306). A pushing rod (327) is provided on the cigarette pushing baffle (325) to push cigarettes in the cigarette sliding slot (314) to move forward.

In the automatic supplying unit (3) for cigarette samples, a roller photoelectric switch (329) is provided on the rear bracket (312) of the cigarette collection box to determine an initial position of a sampling roller during rotation.

In the automatic supplying unit (3) for cigarette samples, a cigarette pushing photoelectric switch (304) is provided on a cigarette pushing lead screw platform installation seat (303) to determine an initial position of the cigarette pushing lead screw platform (326). A cigarette pushing baffle (325) is provided on the cigarette pushing lead screw platform (326) via the cigarette pushing baffle installation seat (306).: pushing rod (327) is provided on the cigarette pushing baffle (325) to push the cigarette within the cigarette pushing sliding slot (314) to move forward. The cigarette pushing lead screw platform installation seat (303) is fixed on the base (301), and the motor is connected with the lead screw in the cigarette pushing lead screw platform (326) via a coupler.

In the cigarette holding and force applying unit (5), the flicking claw mechanism may comprise a flicking claw installation seat (503), a cigarette holding pneumatic claw (522) installed on the flicking claw installation seat (503), a lower claw seat (523), a lower claw (524), and an upper claw (525). Soft silicone pads are provided in the upper and lower claws. By combining with the control unit, the mechanism is able to simulate holding mode and holding strength of a human upon ash-flicking.

In the smoke collecting unit (6), the trap module may comprise a trap pressing opening (609), a filter seat (611), a filter cover (612), a filter (613), a trap tray (603), and a trap adapter (614).

A method for assessing hot coal fallout propensity of burning cigarette by using the automatic multichannel apparatus for assessing hot coal fallout propensity of burning cigarette may comprise the following detection process: after the apparatus is powered on and an automatic initialization is completed, the automatic supplying unit for cigarette samples operates to perform cigarette loading action, the rotary plate disposed in the multichannel rotary plate unit rotates and determines whether the rotary plate has rotated. N times, if it is NO, the automatic supplying unit for cigarette samples continues to operate to performs the cigarette loading action, and after the rotary plate rotates once and performs determination again, if it is YES, then the cigarette sample is automatically ignited and the burning line detection unit and the suction unit operate; after the cigarette ignition is completed, the rotary plate rotates once, at this time it is determined whether the rotary plate rotates N times, if it is NO, the cigarette sample is automatically ignited and the burning line detection unit and the suction unit are continued to operate to perform an ignition action, and after the rotary plate rotates immediately once, if the determination is YES, the cigarette holding and force applying unit operates to complete the cigarette flicking action; subsequently, the automatic hot coal fallout detection and removal unit operates and determines whether hot coal fallout of burning cigarettes occurs after flicking, if it is YES, then the cigarette pull claw acts to put the cigarette into an ash hopper, otherwise the process continues to the next step, that is, the cigarette sample is automatically ignited and the burning line detection unit operates; determining whether the burning line has been reached, if it is YES, the cigarette pull claw acts to put the cigarette into the ash hopper, otherwise the above actions are repeated and the operating condition is recorded in a software.

The structure of the apparatus, the installation method, the working principle and the working process according to the present invention are further described as follows:

The automatic multichannel apparatus for assessing hot coal fallout propensity of burning cigarette according to the present invention may comprise a multichannel rotary plate unit, an automatic hot coal fallout detection and removal unit, an automatic supplying unit for cigarette samples, an automatic ignition and burning line detection unit for cigarette samples, a cigarette holding and force applying unit during the test, a smoke collecting unit, a suction unit, a gas discharge unit during the suction process and a main frame unit. Each functional unit is effectively connected and integrated with an air path unit and a control circuit, and the control method constitution for linkage of each component is accomplished according to test requirements, and achieved by a programmable controller. The basic function of the automatic multichannel apparatus for assessing hot coal fallout propensity of burning cigarette may be achieved by following steps: placing a cigarette sample inside the automatic supplying unit for cigarette samples, and pushing the cigarette onto the multichannel rotary plate unit through a series of mechanical actions (repeating the previous action until all samples are placed on the rotary plate); the automatic ignition and burning line detection unit for cigarette samples sequentially ignites the provided cigarettes in the above process; the ignited cigarettes reaching to a force applying position, performing auxiliary holding, force applying and other actions on the tested samples by the cigarette holding and force applying unit; performing detection of hot coal fallout status of the previous cigarette samples by the automatic hot coal fallout detection and removal unit, if hot coal fallout is dropped after a force is applied, taking out the sample by the control unit, if hot coal fallout is not dropped after the force is applied, repositioning the sample by the control unit, and repeating the suction action, the force applying action and the hot coal fallout detection action until all cigarettes without hot coal fallout reach the position of the burning line and are pull out, then the samples complete the whole test. During the test, the automatic hot coal fallout detection and removal unit, the automatic supplying unit, the automatic ignition and burning line detection unit, the holding and force applying unit, the suction unit, the smoke collecting unit and the smoke discharge unit are all controlled under the control unit and the control method, which control relevant executors to perform actions on relevant components in each unit.

According to the present invention, the multichannel rotary plate unit realizes the multichannel rotary plate structure for samples, connection and sealing of the sample suction channels, hollow pipes of the rotary plate structure, etc., and related detection components and the motor actuating mechanism are disposed such that the samples are tested under ISO3308 suction conditions. Such unit is achieved by the following configuration. The transmission seat base is secured on the main frame, and the transmission seat is installed above the base (the transmission seat base may be used in an electric mode or a pneumatic mode). A rotary face at one end of the transmission seat is provided with a rotary plate flange, and the multichannel rotary plate is fitted on the rotary plate flange via the flange press knob. One end of the securing plate is installed on a securing surface of the rotary plate. A sealing structure is connected between the rotary plate and the securing plate. The sealing structure includes a labyrinth ring cover, a labyrinth ring, a labyrinth ring connection seat and a Varisseal. The first pneumatic joint is installed on the securing plate. When the rotary plate rotates to drive a sample to the position of the first pneumatic joint and is coaxial with the first pneumatic joint, the sample communicates with the suction unit. The multichannel rotary plate is driven by a stepper motor, and the coding plate for positioning the multichannel rotary plate and the photoelectric switch for position detection are installed on the support seat. The multichannel rotary plate is driven to rotate by starting the stepper motor, and a rotation angle of the stepper motor is controlled by the coding plate and the photoelectric switch for position detection, so that the sample and the first pneumatic joint are coaxial with the sealing structure to meet detection conditions for the multichannel samples. A handle is installed in front of the rotary plate to facilitate removing, cleaning and installation of the rotary plate. The multichannel rotary plate is disposed to load multiple sample channels. According to the test requirements, the channels can be set up to 8 channels. The overall design of this unit satisfies simultaneous testing of multiple samples. The position detection may control the stepper motor, thereby achieving effective relation between the suction requirement and the cigarettes. The coaxial design of the samples, the structural seal and the first pneumatic joint, as well as the design of the multichannel rotary plate may achieve that the suction process meets the suction conditions under ISO3308 and wind speed requirements for a smoking machine.

The automatic hot coal fallout detection and removal unit according to the present invention is achieved by providing a hot coal fallout determination module, a cigarette removal module, and an executor for automatically performing this process. Specifically, the cigarette removal module is installed on the cylinder installation seat via two parallel linear bearings. A guide shaft is installed in the middle of the linear bearings, and a cigarette pull cylinder is installed between the two parallel linear bearings and fixed on the cylinder installation seat. The guide shaft and the cigarette pull cylinder are fixed at one end of pneumatic fingers connection plate for taking out the sample, and the other end thereof is connected to the pneumatic fingers. The pull claw is mounted below the pneumatic fingers for taking out the sample. The hot coal fallout determination module may include a base, an adapter and a hot coal fallout detection temperature sensor installed inside the adapter. The hot coal fallout detection temperature has a front end being coaxial with a probe guide pipe. A probe connection gong sleeve is connected between the probe guide pipe and the probe seat. The action of this unit is implemented by controlling the upstream solenoid valves. The working process of the unit is described as below. The cigarette samples on the multichannel rotary plate are rotated to the position where the unit locates. The temperature of the combustion cone surface of the cigarette sample is detected by the hot coal fallout detection temperature sensor provided in the unit. The tested value of the temperature is used to perform determination, wherein if the detected temperature value is higher than a set temperature, for example, the set temperature is 80° C., when the detected temperature is higher than 80° C., it is determined that the sample has no hot coal fallout, and the automatic cigarette removal module is started to reposition the sample. On the other hand, if the detected temperature is lower than the set temperature, for example, the set temperature is 80° C., when the detected temperature is lower than 80° C., the cigarette removal module is activated to take out the sample. The design of this unit realizes automatic detection of cigarette hot coal status, and starts the finger connection plate and the sample removal claw by setting removal of the sample, performs a logic determination after the control unit collects data, starts the sample removal operation to start the finger connection plate and the sample removal claw to perform the operation of taking out the sample and repositioning the sample. The provision of this unit realizes automatic detection of the sample's hot coal fallout state during the test process, and performs operations of the automatic removal and repositioning the sample by the logical determination after the data is collected by the control unit. This may effectively overcome human influence and improve detection efficiency.

According to the present invention, the automatic supplying unit for cigarette samples may be mainly composed of a cigarette supplying module, a cigarette pushing module, and combination of related control modules. The modules are all installed on the supplying unit base. The cigarette supplying module may mainly consist of a roller motor, a motor bracket, a rear bracket of a cigarette collection box, a roller, a cigarette sliding slot, a cigarette collection box, a correlation photoelectric switch a, a front bracket of the cigarette collection box, a sample bracket, a correlation photoelectric switch b, a cigarette supplying guide plate, a roller photoelectric switch, a sampling roller coding plate, a roller coupler and so on. The working process can be described as following. Samples to be tested (several cigarettes) are put into the cigarette collection box, and the samples to be tested in the cigarette collection box are naturally supplied into the cigarette sliding slot due to gravity. The cigarette collection box is fixed on the front bracket and rear bracket of the cigarette collection box, and a roller is installed therebetween. The cigarette loading roller coding plate is provided on a rear end of the roller where one end of the roller coupler is connected with the cigarette loading roller coding plate and the other end is connected with the roller motor. The roller motor is mounted on the motor bracket. The motor bracket is fixed on the rear bracket of the cigarette collection box and the roller photoelectric switch is installed below it. The cigarette supplying guide plate is located under the roller and installed between the front bracket and the rear bracket of the cigarette collection box. The cigarette sliding slot is provided below the cigarette supplying guide plate and is installed on the cigarette loading base. The correlation photoelectric switch a and the correlation photoelectric switch b are used to detect whether the samples enter into the cigarette sliding slot. The cigarette pushing module may be mainly composed of a cigarette pushing motor, a motor installation seat, a coupler, a cigarette pushing baffle installation seat, a bearing base, a cigarette pushing photoelectric switch, a cigarette pushing lead screw platform installation seat, a cylinder installation seat, a claw cylinder, a claw installation seat, a cigarette loading claw, a transverse cylinder, a pushing rod, a cigarette pushing lead screw platform, a cigarette pushing baffle and so on. The pushing rod is located above the cigarette sliding slot. One end of the cigarette pushing baffle is installed on the cigarette pushing baffle installation seat and the other end is equipped with a pushing rod. A lower part of the cigarette lead screw platform is fixed on the lead screw platform installation seat, and an upper part is connected to and fixed with the pushing rod baffle installation seat. The cigarette pushing motor is located behind the pushing rod baffle installation seat and installed on the motor installation seat. The bearing base is located directly in front of the motor installation seat and above the screw platform installation seat and being fixed therewith, and the coupler is installed therebetween. One end of the coupler is connected with the cigarette pushing motor, and the other end thereof is connected with the cigarette pushing lead screw platform. The transverse cylinder is located on the right side of the cigarette pushing lead screw platform and the other end thereof is fixedly connected with the cylinder installation seat. The cylinder installation seat is installed on the cigarette loading base. The claw installation seat is mounted in front of the transverse cylinder. The claw cylinder is installed on the claw installation seat and the other end thereof is provided with the cigarette loading claw. The cigarette pushing photoelectric switch is installed on the lead screw platform installation seat and is located at tight side in front of the bearing base. These connection relationships ensure normal operation of the cigarette pushing module. The working process can be described as below. The roller motor is started and driven by the roller coupler, thereby driving the roller to rotate so that the samples may pass through the cigarette supplying guide plate and are determined by the photoelectric switch a and the photoelectric switch b whether the samples are fallen into the cigarette sliding slot. If the samples to be tested are located in the sliding slot, then the cigarette pushing motor is started and drives the coupler to rotate, thereby driving the cigarette pushing lead screw platform to move forth and back. Accordingly, the cigarette pushing baffle installation seat, the push rod baffle, and the push rod move forth and back, and the samples are pushed onto the sample bracket. The samples are then clamped by the cigarette loading claw, which is driven by the claw cylinder. After the claw installation seat is driven by the transverse cylinder to move forth and back so as to bring the samples to the sample installation position on the multichannel rotary plate unit, the cigarette loading claw is opened and returns to the original position and waits for pushing next cigarette on the sample installation position on the multichannel rotary plate unit. The cigarette pushing module functions to accurately push the samples entering the cigarette sliding slot on the sample installation position on the multichannel rotary plate unit. The working process of the automatic supplying unit for cigarette samples in the automatic multichannel apparatus for assessing hot coal fallout of burning cigarettes realizes automatic installation of cigarette samples to the sample installation position on the multichannel rotary plate unit, and eliminates influence of manual installation of the samples to the tested position, which has improved work efficiency and installation repeatability.

The automatic ignition and burning line detection unit for cigarette samples according to the present invention may mainly comprise an automatic ignition module and a burning line detection module. The automatic ignition module may be mainly composed of an igniter adapter, a photoelectric switch for hot coal fallout detection, a lower igniter support seat, an igniter photoelectric switch baffle, a cigarette ignition unit bottom plate, an igniter electric platform, a flange connection plate, a motor flange, a motor, a coupler, an igniter handle, an igniter rod, an upper igniter support seat, an igniter fixing sleeve, an igniter head and other components, which has following functions. When an unburned cigarette reaches the position of the unit, the igniter electric platform and an igniter are driven by the motor to move toward an end of the cigarette. When the igniter electric platform and the igniter move to a set position, the ignition switch is turned on to perform automatic ignition function. The burning line detection module may be mainly composed of an adapter, a burning line detection temperature sensor, an adapter cover, a movable platform (that is, a burning line detection movable platform), a probe linkage gong sleeve, a probe bar, a probe sheet and other components. The burning line detection module has following functions. When the burning line of the burning cigarettes reaches a set position, the burning line detection unit fixed on the adapter detects the position of the burning line of the burning cigarettes and the entire operating process ends.

In the test of the present invention, the cigarette holding and force applying unit is a core component of the automatic multichannel apparatus for assessing hot coal fallout propensity of burning cigarettes. This unit may comprise an auxiliary holding module and a force applying module for cigarette samples. The auxiliary holding module may include a flicking claw installation seat, a flicking claw support seat, a claw limit baffle, a limit photoelectric switch, a motor slide table base, a one-dimensional platform of the holding module, a flicking pneumatic claw, a lower flicking claw seat, a lower flicking claw, a upper flicking claw and so on. The auxiliary holding module may function to tightly clamp samples applied with a force. Soft silicone pads are provided in the upper and lower claws, and cooperate with the control unit to simulate holding mode and clamp strength as human ash-flicking action. Meanwhile, adjustment of the holding position can be performed by the claw limit baffle, the limit photoelectric switch and the one-dimensional platform of the holding module. The force applying module may include a flicking head, a flicking sheet, an upper vibration-damping sheet, a rotary cylinder installation seat, a rotary cylinder, a motor slide table installation plate, a flicking assembly base, a flicking assembly pneumatic slide table, a flicking module lead screw slide table, a null photoelectric switch, a null switch baffle, a flicking module installation seat, a flicking module pneumatic slide table, a flicking sheet installation seat and a lower vibration-damping sheet. The force applying module is used to flick cigarettes. The force applying operation to the cigarettes and adjustment of the flicking strength and duration can be achieved by combining movement of the rotary cylinder and the flicking module pneumatic slide table. Meanwhile, adjustment of the flicking position can be achieved by the null photoelectric switch, the null switch baffle and the flicking module lead screw slide table. Clamping of the cigarette sample is released and the whole module moves to the initial position after the force applying operation is completed. This unit may effectively implement setting mode for force applying operation for cigarette samples, and realizes automatic operations of the whole movement, auxiliary holding, force applying, and resetting of the module during the process. Furthermore, all of process parameters are adjustable and controllable.

According to the present invention, the smoke collecting unit during the suction process mainly collects smoke of the cigarettes in each of the multiple channels to reduce pollution to pipelines during the process and ensure long-term stable use of the entire apparatus. The collecting unit may mainly comprise a pressing rod installation seat, which is fixed on a compression cylinder bracket. The compression cylinder bracket is fixed on a smoke collecting unit installation seat by a corner element, and a trap compression cylinder is fixed on the pressing rod installation seat. A trap pressing opening is fixed on an end of the trap compression cylinder. A rear end of a pneumatic joint fixed on the trap compression cylinder is connected with the multichannel rotary plate. A trap adapter is directly fixed on the smoke collecting unit installation seat. A trap tray is fixed on the smoke collecting unit installation seat via three standard shaft rods. A gas discharge joint is fixed on the smoke collecting unit installation seat, and the other end of the gas discharge joint is connected with the suction unit. A filter seat is placed in the trap tray, and a filter is placed in the filter seat. A filter cover is fixed in the filter seat via a filter clip triangular clip. When the trap compression cylinder drives the trap pressing opening to move downward to a surface of the filter cover, a closed cavity is formed with the filter seat, the filter and the trap adapter. When the suction unit performs suction operation, the collecting unit can filter impurities in the suction gas, thereby ensuring clean of interior of the suction unit and a long-term efficient use thereof.

According to the present invention, the suction unit may comprise a slide rail and a slide rail seat, a transition block provided on the slide rail seat, a movable block installed on the transition block and connected with a motor shaft, wherein a suction piston is driven by a motor to perform a suction action. The motor is installed on s suction motor bracket, and a motor connection plate is installed on the motor. A piston glass tube is connected with the motor connection plate and a suction cylinder base, and is fastened by using s tension rod and a cylinder adjustment nut. A null suction photoelectric switch is fixed on the base. The base and the suction motor bracket are fixed on a suction unit support rod.

In the automatic multichannel apparatus for assessing hot coal fallout propensity of burning cigarettes of the present invention, the control unit mainly sends instructions to the solenoid valves by the control unit. The instructions are sent in time series. The solenoid valves control pneumatic executors to perform related operations. Further, the control unit sends instructions to the motor, which controls electric executors to perform related operations. The photoelectric switch controls initial positions of the electric executors. The burning line and cigarette sample's hot coal fallout state are detected by an infrared detector to determine whether the control is performed to stop operation or remove the sample. The implementation of the control unit can be described as below. The operation of the overall detection apparatus is controlled by a program in the control unit. Throttle valves provided in each unit function to adjust speed of the cylinder movement. The electric executors, the pneumatic executors and the photoelectric switches are used to control flicking and holding actions, and flicking position and force applying position. The electric executors and photoelectric switches disposed in the automatic ignition and burning line detection unit for cigarette samples are used to control movement of the igniter head. The electric executors, the pneumatic executors and the photoelectric switches disposed in the automatic supplying unit for cigarette samples are used to control movement of the pushing rod and the rotary sampling of the roller. The electric executors and the photoelectric switches disposed in the multichannel rotary plate unit are used to control rotation of the rotary plate. Meanwhile, the program in the control unit controls a pressure regulating valve to adjust a total pneumatic pressure.

The method for assessing hot coal fallout propensity of burning cigarette by using the automatic multichannel apparatus for assessing hot coal fallout propensity of burning cigarette may comprise following detecting process; after the apparatus is powered on and an automatic initialization is completed, the automatic supplying unit for cigarette samples operates to perform cigarette loading action, the rotary plate disposed in the multichannel rotary plate unit rotates and determines whether the rotary plate has rotated N times, if it is NO, the automatic supplying unit for cigarette samples continues to operate to performs the cigarette loading action, and after the rotary plate rotates once and performs determination again, if it is YES, then the cigarette sample is automatically ignited and the burning line detection unit and the suction unit operate; after the cigarette ignition is completed, the rotary plate rotates once, at this time it is determined whether the rotary plate rotates N times, if it is NO, the cigarette sample is automatically ignited and the burning line detection unit and the suction unit are continued to operate to perform an ignition action, and after the rotary plate rotates immediately once, if the determination is YES, the cigarette holding and force applying unit operates to complete the cigarette flicking action; subsequently, the automatic hot coal fallout detection and removal unit operates and determines whether hot coal fallout of burning cigarettes occurs after flicking, if it is YES, then the cigarette pull claw acts to put the cigarette into an ash hopper, otherwise the process continues to the next step, that is, the cigarette sample is automatically ignited and the burning line detection unit operates; determining whether the burning line has been reached, if it is YES, the cigarette pull claw acts to put the cigarette into the ash hopper, otherwise the above actions are repeated and the operating condition is recorded in a software.

The present invention may achieve simultaneous testing of multiple cigarettes, and can automatically perform a series of actions such as cigarette loading, automatic sample supplying, automatic cigarette ignition and burning line detection, force applying test, hot coal fallout detection and cigarette pulling and so on, so as to improve test repeatability and work efficiency.

BRIEF DESCRIPTION OF THE DRAWINGS

In FIGS. 1 and 2: 1. Rotary Plate; 2. Hot Coal Fallout Detection Unit; 3. Automatic Supplying Unit for Cigarette Samples; 4. Cigarette ignition and Burning Line Detection Unit; 5; Holding and Flicking Unit; 6. Trap Unit; 7. Ash Hopper; 8. Suction Unit; 9. Smoke Discharge Unit; 10. Electric Circuit and Air Path Control Unit; 11. Main Frame.

Wherein: 101. Labyrinth Ring Sleeve; 102. Sample; 103. Rotary Plate Flange; 104. Flange Press Knob; 105. Handle; 106. Rotary Plate; 107. Securing Plate; 108. Transmission Seat; 109: Support Seat; 110. Coding Plate; 111. Stepper Motor; 112. Photoelectric Switch; 113. Photoelectric Switch Seat; 114. Rotary Plate Base; 115. First Pneumatic Joint; 116. Variseal; 1:17. Labyrinth Ring Connection Seat; 118. Labyrinth Ring.

Figure 1:
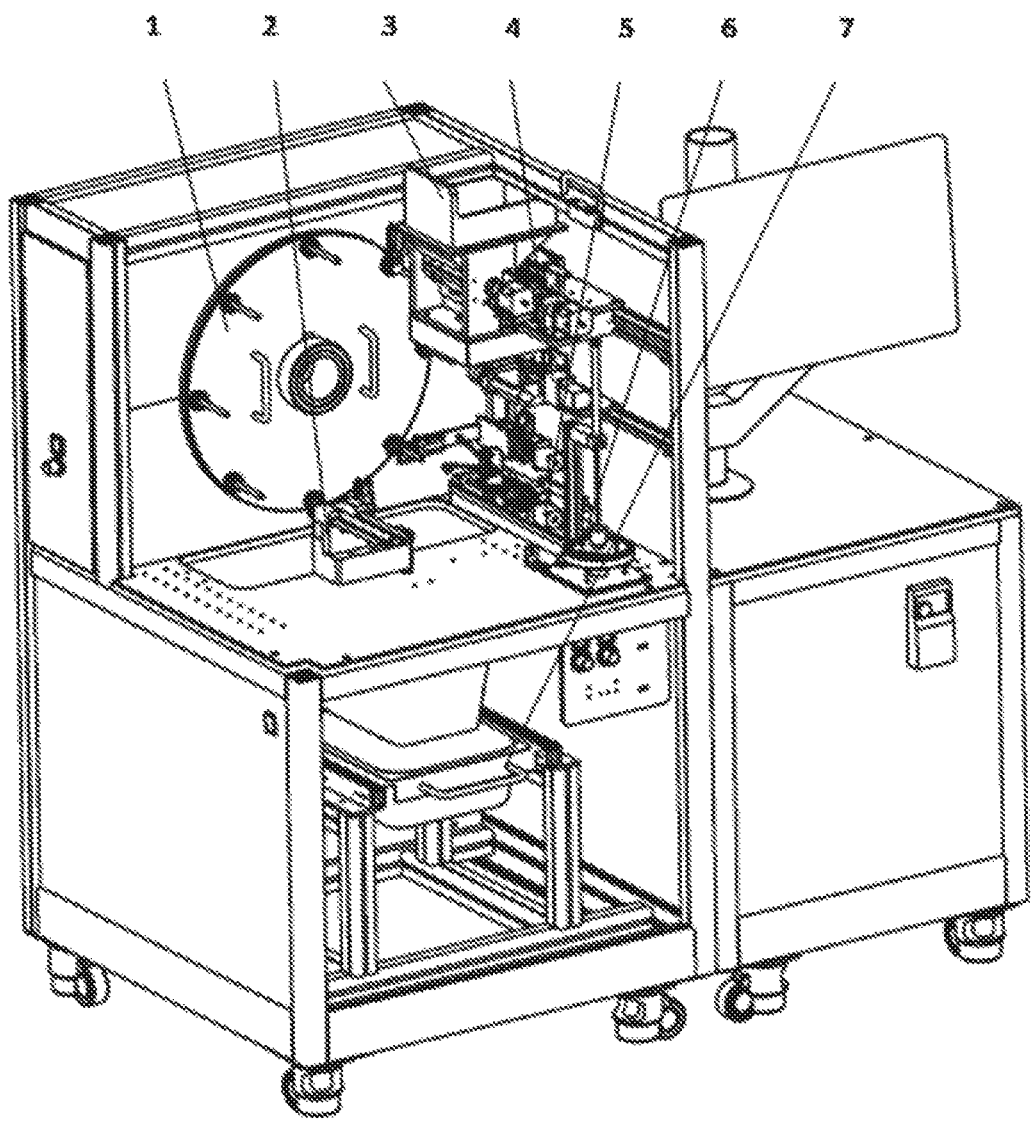
FIG. 1 is a front view of an automatic multichannel apparatus for assessing hot coal fallout propensity of burning cigarettes according to an exemplary embodiment of the present invention.
Figure 4:
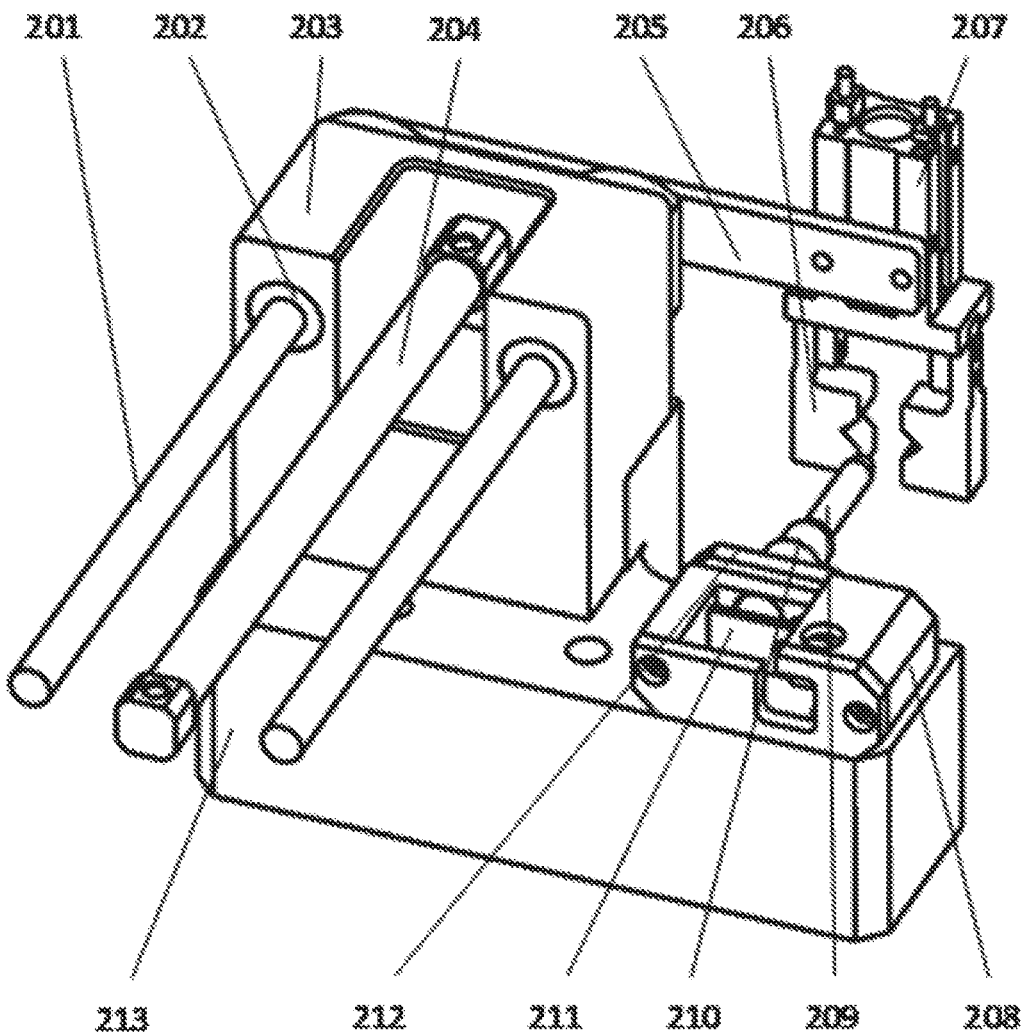

FIG. 4 is a schematic structure view showing a hot coal fallout detection unit of the automatic multichannel apparatus for assessing hot coal fallout propensity of burning cigarettes as shown in FIG. 1.

Wherein: 201. Guide Shaft; 202. Linear Bearing; 203. Cigarette Pull Cylinder Installation Seat; 204. Cigarette Pull Cylinder; 205. Cigarette Pull Pneumatic Finger Connection Plate; 206. Cigarette Pull Claw; 207. Cigarette Pull Pneumatic Finger; 208. Adapter; 209. Probe Guide Tube; 210. Probe Connection Gong Sleeve; 211. Hot Coal Fallout Detection Temperature Sensor; 212. Probe Seat; 213. Hot Coal Fallout Unit Installation Seat.

Figure 5:
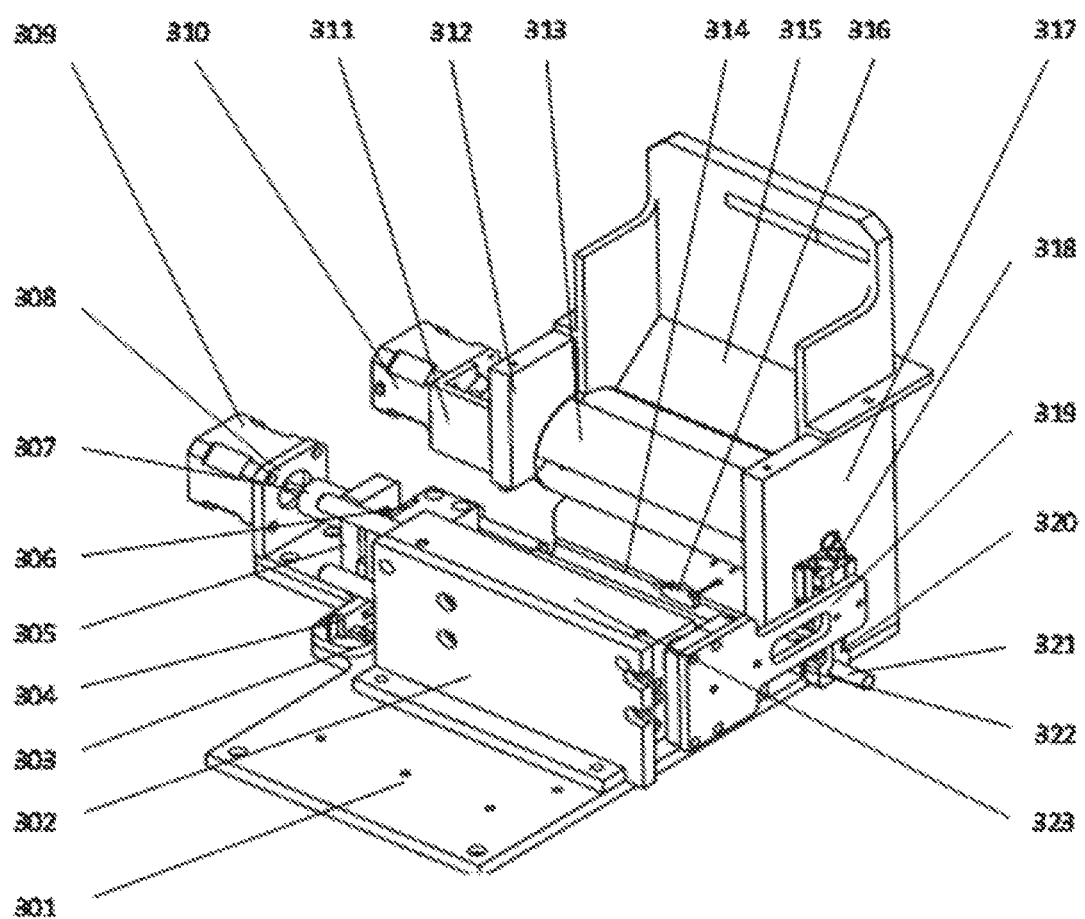

FIG. 5 is a schematic structure view showing an automatic supplying unit for cigarette samples of the automatic multichannel apparatus for assessing hot coal fallout propensity of burning cigarettes as shown in FIG. 1.

Wherein: 301. Cigarette Loading Base; 302. Cylinder Installation Seat; 303. Cigarette Pushing Lead Screw Platform Installation Seat; 304. Cigarette Pushing Photoelectric Switch; 305. Bearing Base; 306. Cigarette Pushing Baffle Installation Seat; 307. Coupler; 308. Motor Installation Seat; 309, Cigarette Pushing Motor; 310. Roller Motor; 311. Motor Bracket; 312, Rear Bracket of a Cigarette Collection Box; 313. Roller; 314. Cigarette Sliding Slot; 315. Cigarette Collection Box; 316 Correlation Photoelectric Switch a; 317. Front Bracket of the cigarette collection box; 318. Claw Cylinder; 319. Claw Installation Seat; 320. Cigarette Loading Claw; 321. Sample; 322. Sample Bracket; 323. Transverse Cylinder; 324. Roller Coupler; 325. Cigarette Pushing Baffle; 326. Cigarette Pushing Lead Screw Platform; 327. Pushing Rod; 328, Coding Plate of a Cigarette Loading Roller; 329. Roller Photoelectric Switch; 330, Cigarette Supplying Guide Plate; 331. Correlation Photoelectric Switch b.

Figure 6:
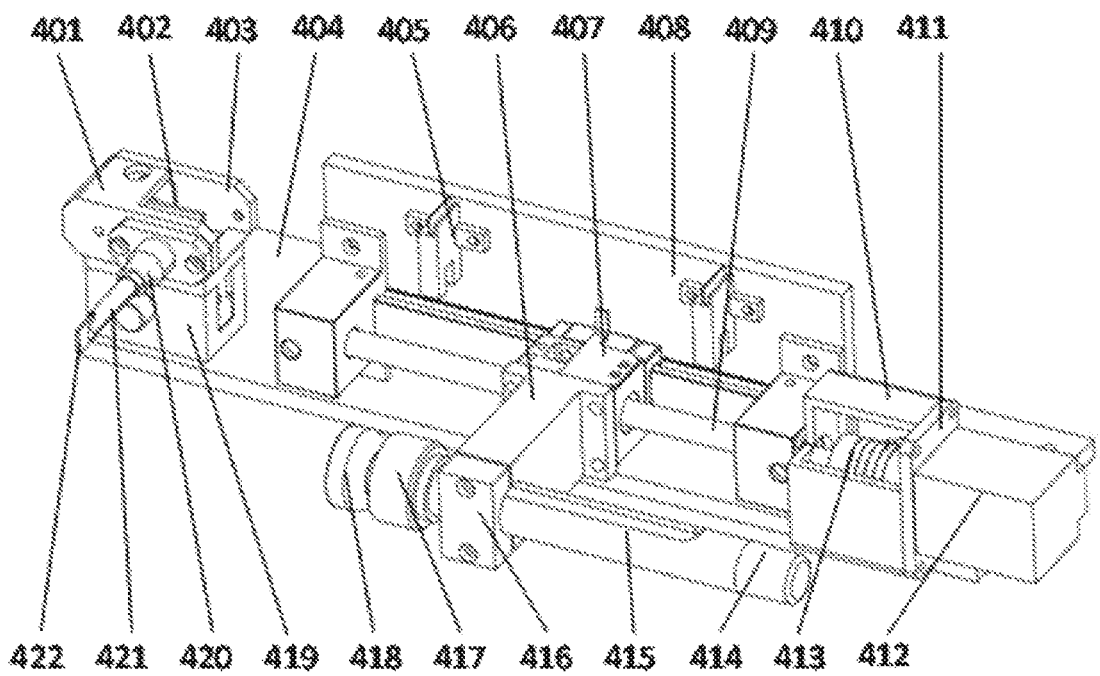

FIG. 6 is a schematic structure view showing an ignition unit of the automatic multichannel apparatus for assessing hot coal fallout propensity of burning cigarettes as shown in FIG. 1.

Wherein: 401. Burning Line Detection Adapter; 402. Burning Line Detection Temperature Sensor; 403. Burning Line Detection Adapter Cover; 404. Unit Bottom Plate; 405. Photoelectric Switch for Probe Detection; 406. Lower Igniter Support Seat; 407. Igniter Photoelectric Switch Baffle; 408. Lateral Securing Seat; 409. Igniter Electric Platform; 410. Flange Connection Plate; 411. Motor Flange; 412, Platform Driving Motor; 413. Coupler; 414. Igniter Handle; 415. Igniter Rod; 416. Upper Igniter Support Seat; 417. Igniter Fixing Sleeve; 418. Igniter Head; 419. Movable Platform (Burning Line Detection Movable Platform); 420. Probe Linkage Gong Sleeve; 421. Probe Shaft; 422. Probe Piece.

Figure 7:
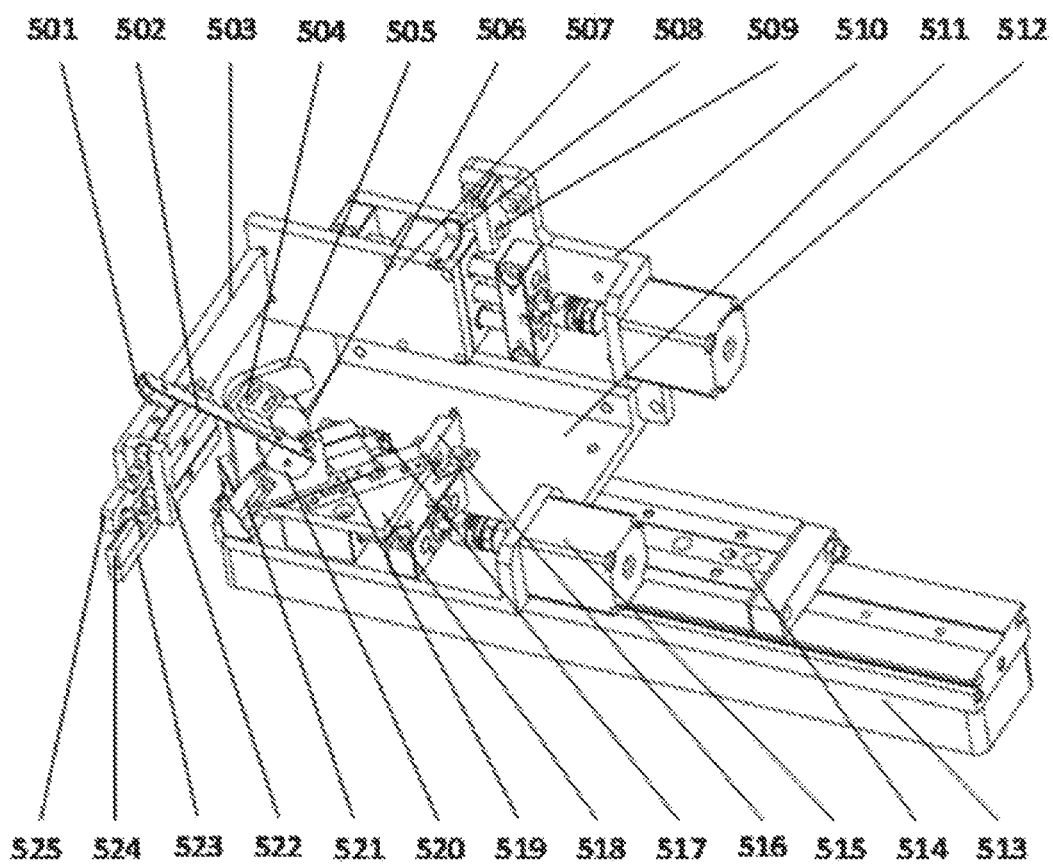

FIG. 7 is a schematic structure view showing a holding and flicking unit of the automatic multichannel apparatus for assessing hot coal fallout propensity of burning cigarettes as shown in FIG. 1.

Figure 8:
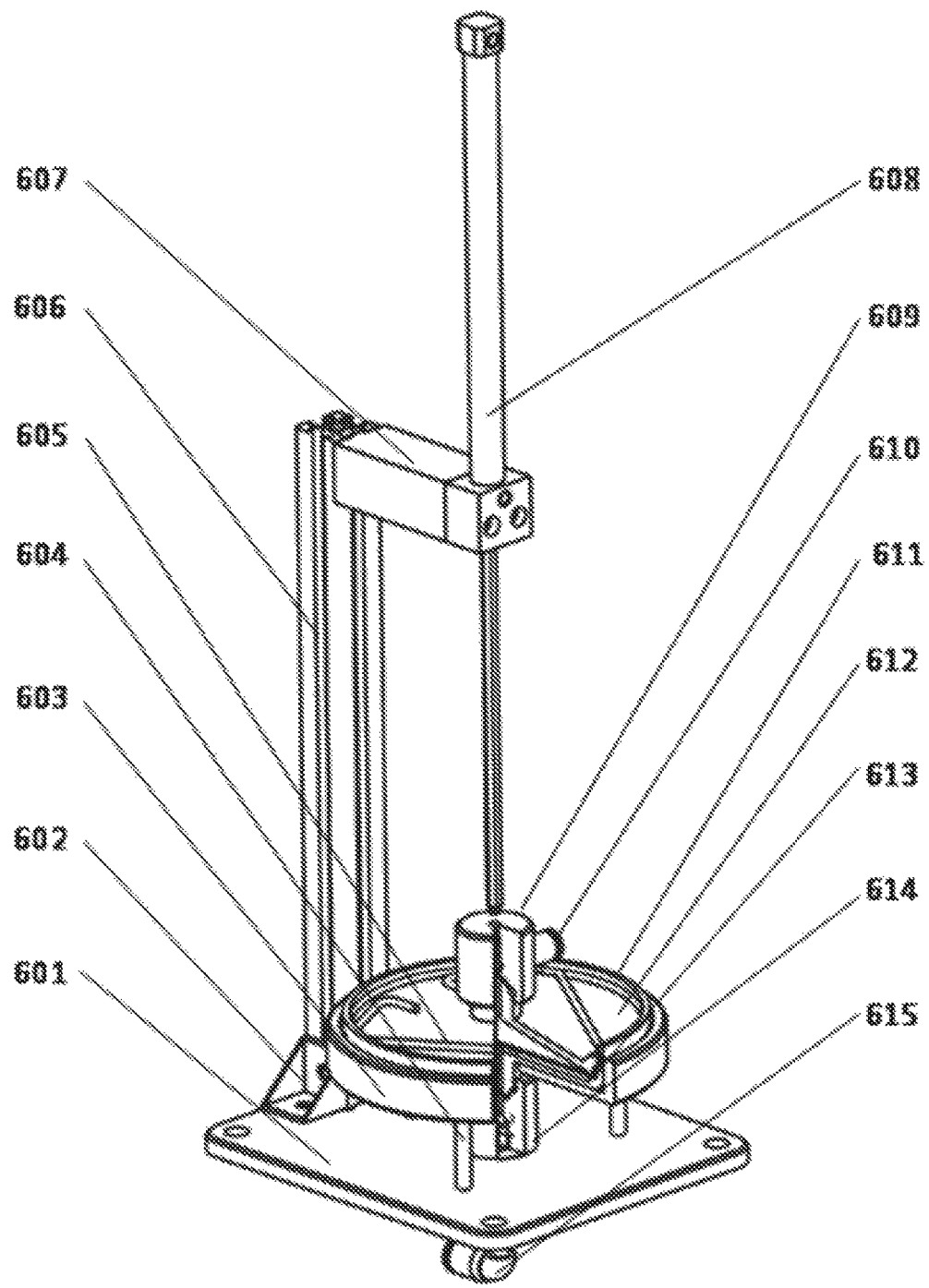

Wherein: 501. Flicking Head; 502. Flicking Sheet; 503. Flicking Claw Installation Seat; 504. Upper Vibration-damping Sheet; 505. Rotary Cylinder Installation Seat; 506. Rotary Cylinder; 507. Cigarette Flicking Claw Support Seat; 508. Claw Limit Baffle; 509. Limit Photoelectric Switch; 510. Motor Sliding Table Base; 511. Motor Sliding Table Installation Plate; 512. One-dimensional Motor Platform; 513. Flicking Assembly Base; 514. Pneumatic Sliding Table of the Flicking Assembly; 515. Lead Screw Sliding Table of a Flicking Module; 516. Null Photoelectric Switch; 517. Null Switch Baffle; 518. Flicking Module Installation Seat; 519. Pneumatic Sliding Table of a Flicking Module; 520. Flicking Sheet installation Seat; 521. Lower Vibration-damping Sheet; 522. Cigarette Flicking Pneumatic Claw; 523. Lower Flicking Claw Seat; 524. Lower Flicking Claw; 525. Upper Flicking Claw, FIG. 8 is a schematic structure view of a smoke collecting unit of the automatic multichannel apparatus for assessing hot coal fallout propensity of burning cigarettes as shown in FIG. 1.

Wherein: 601. Smoke Collecting Unit installation Seat; 602. Corner Element; 603. Trap Tray; 604. Standard Shaft Rod; 605. Filter Clip Triangle Clip; 606. Compression Cylinder Bracket; 607. Pressing Rod Installation Seat; 608. Trap Compression Cylinder; 609. Trap Pressing Opening; 610. Second Pneumatic Joint; 611, Filter Seat; 612. Filter Cover; 613. Filter; 614. Trap Adapter; 615. Gas Discharge Joint.

Figure 9:
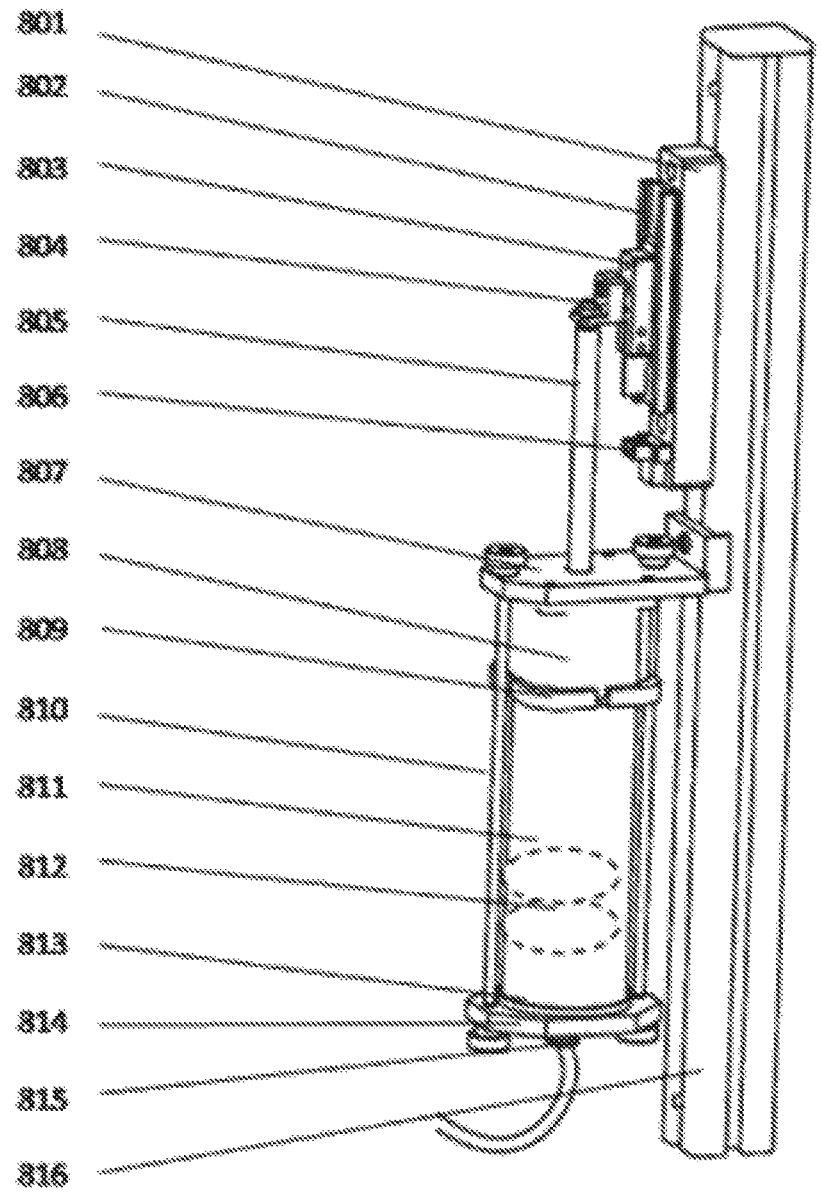

FIG. 9 is a schematic structure view of the suction unit of the automatic multichannel apparatus for assessing hot coal fallout propensity of burning cigarettes as shown in FIG. 1.

Wherein: 801. Suction Unit installation Seat; 802. Slide Rail and Slide Rail Seat; 803. Transition Block; 804. Movable Block; 805. Motor Shaft; 806. Suction Null Photoelectric Switch; 807. Suction Motor Bracket; 808. Suction Motor; 809. Motor Connection Plate; 810. Tension Rod; 811. Suction Cylinder; 812. Suction Piston; 813. Glass Tube Cover; 814. Suction Cylinder Base; 815. Adjustable Cylinder Nut; 816. Suction Unit Support Rod.

Figure 10:
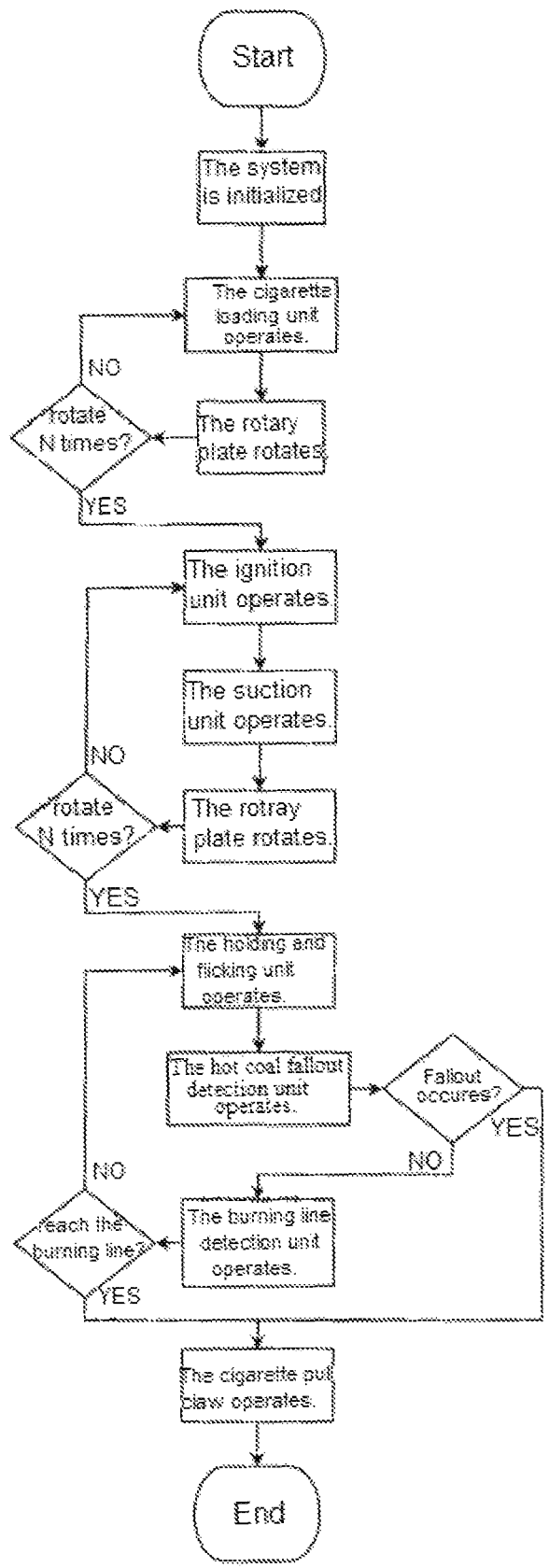

FIG. 10 is a testing flowchart of the automatic multichannel apparatus for assessing hot coal fallout propensity of burning cigarettes as shown in FIG. 1.

Figure 11:
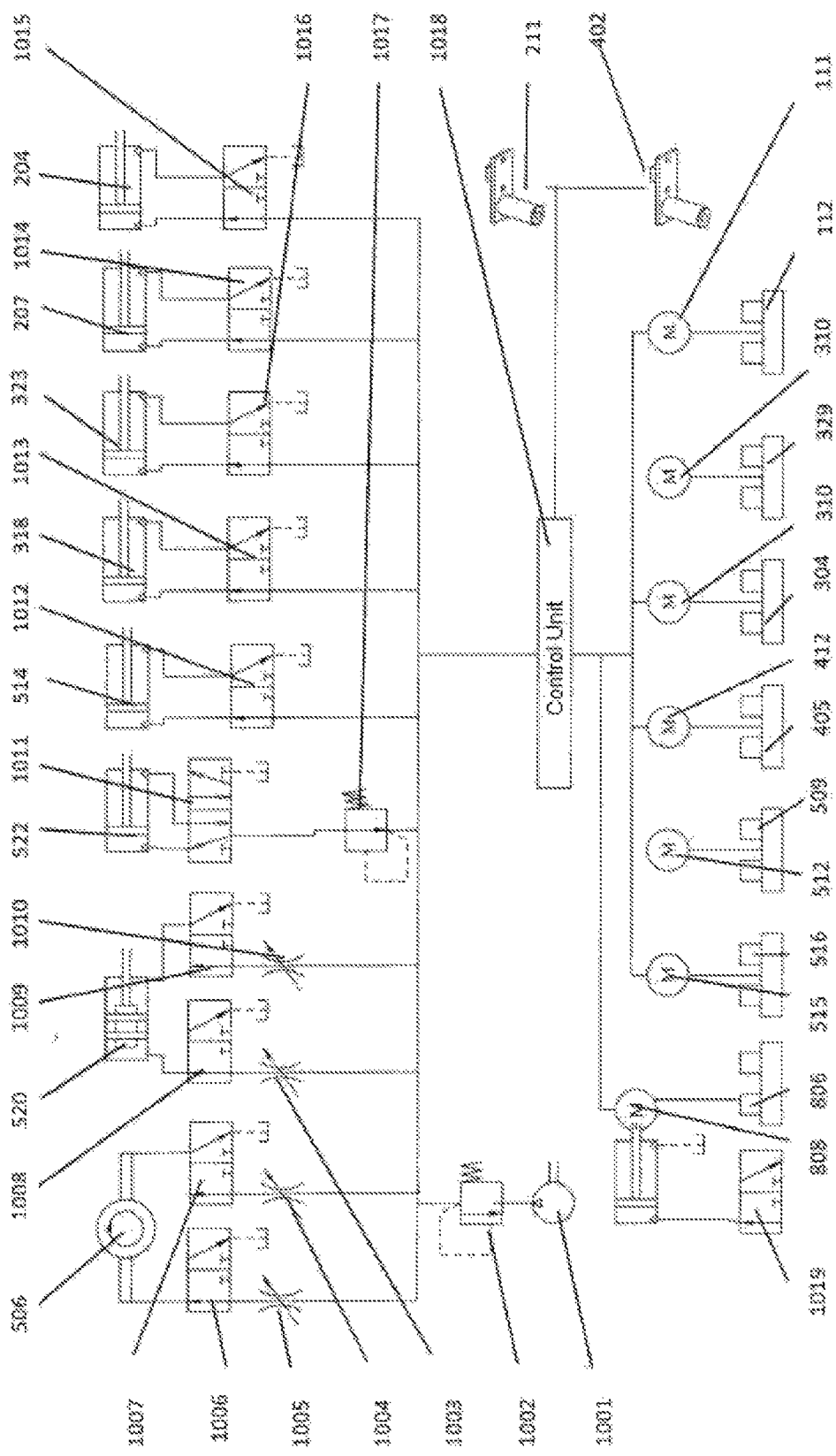

FIG. 11 is a schematic structure view of the control unit of the automatic multichannel apparatus for assessing hot coal fallout propensity of burning cigarettes shown in FIG. 1.

Wherein: 1001. Air Source; 1002. Filter Relief Valve Lubricator; 1003. First Throttle Valve; 1004. Second Throttle Valve; 1005. Third Throttle Valve; 1006. First Solenoid Valve; 1007. Second. Solenoid Valve; 1008. Third Solenoid Valve; 1009. Fourth Solenoid Valve; 1010. Fourth Solenoid Valve; 1011. Fifth Solenoid Valve; 1012. Sixth Solenoid Valve; 1013. Seventh Solenoid Valve; 1014. Ninth Solenoid Valve; 1015. Tenth Solenoid Valve; 1016. Eighth Solenoid Valve; 1017. Relief Valve; 1018. Control Unit; 1019. Eleventh Solenoid Valve.

Figure 12:
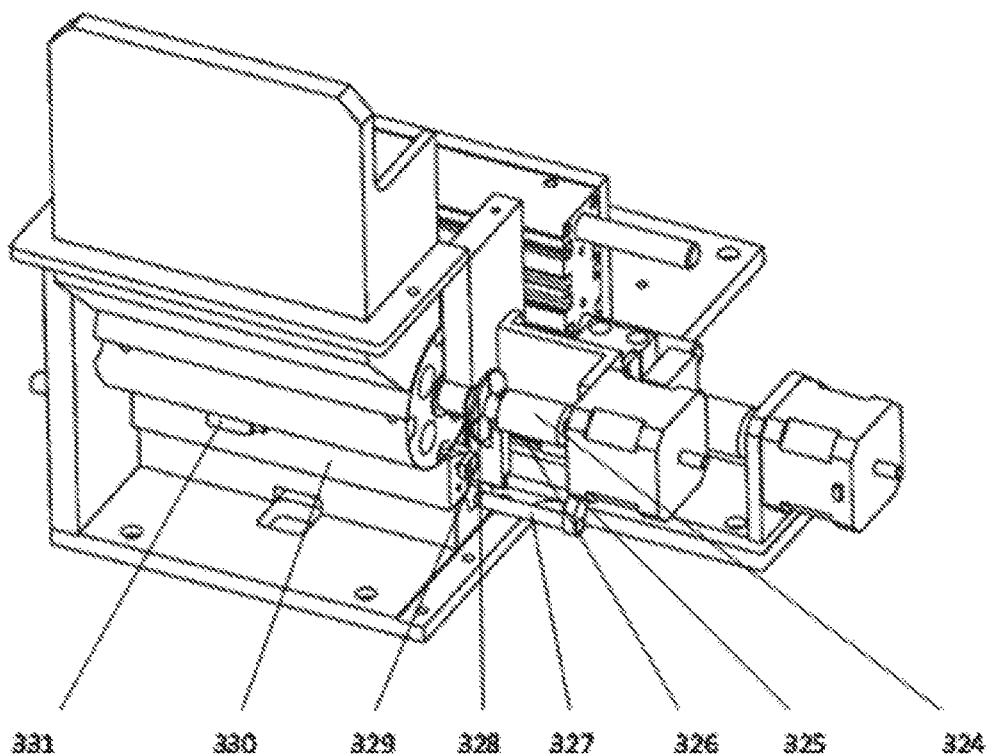

FIG. 12 is another angle axonometric drawing of the automatic supplying unit for cigarette samples as shown in FIG. 5.

Figure 13:
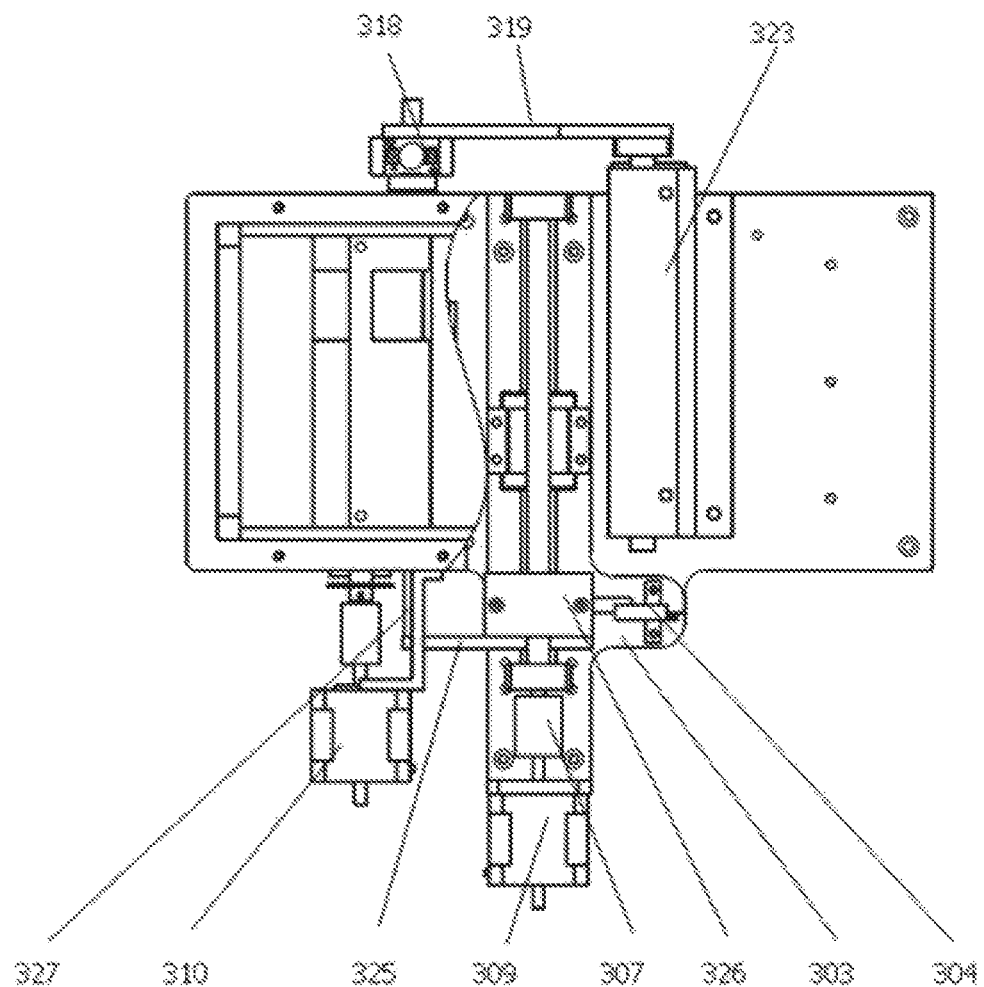

FIG. 13 is a top view of the automatic supplying unit for cigarette samples as shown in FIG. 5.

Figure 14:
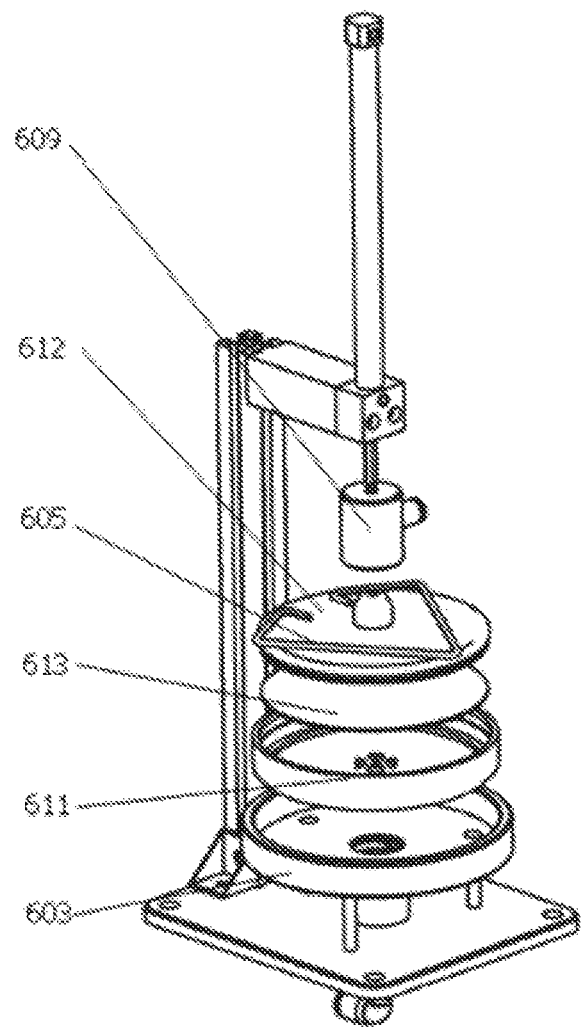

FIG. 14 is an exploring view of the trap unit as shown in FIG. 8.

DETAILED DESCRIPTION

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Figure 2:
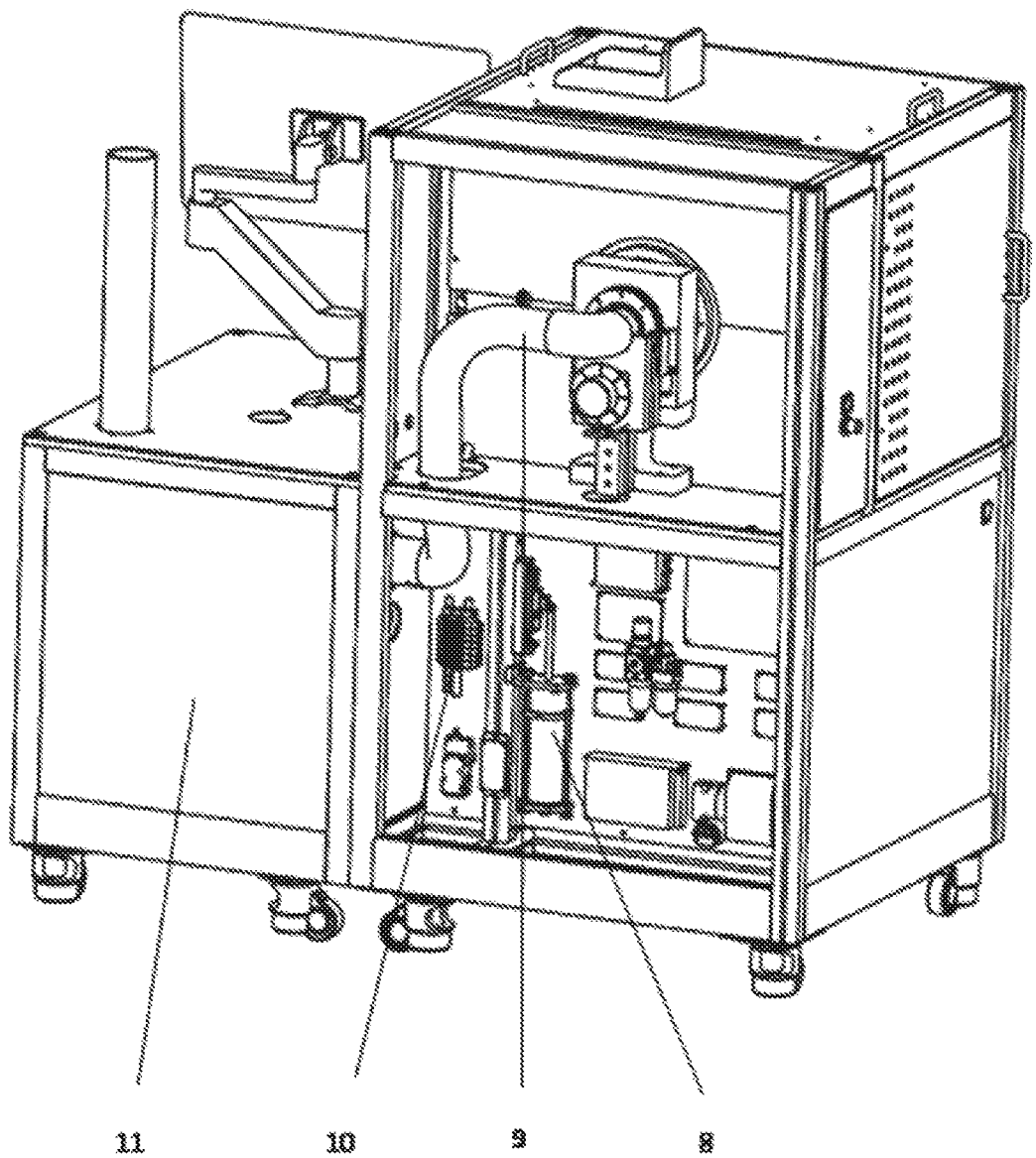
FIG. 2 is a rear view of the automatic multichannel apparatus for assessing hot coal fallout propensity of burning cigarettes according to the exemplary embodiment of the present invention.

Now, the exemplary embodiments of the present invention will be described in detail with reference to attached drawings. An automatic multichannel apparatus for assessing hot coal fallout propensity of burning cigarettes may include a multichannel rotary plate unit 1, an automatic hot coal fallout detecting and removal unit 2, an automatic sample supplying unit 3, an automatic ignition and burning line detection unit 4, a holding and force applying unit 5, a trap unit 6, an ash hopper 7, an electric circuit and air path control unit 10, a suction unit 8, a smoke discharge unit 9, a main frame 11 and so on, as shown in FIGS. 1 and 2.

Figure 3:
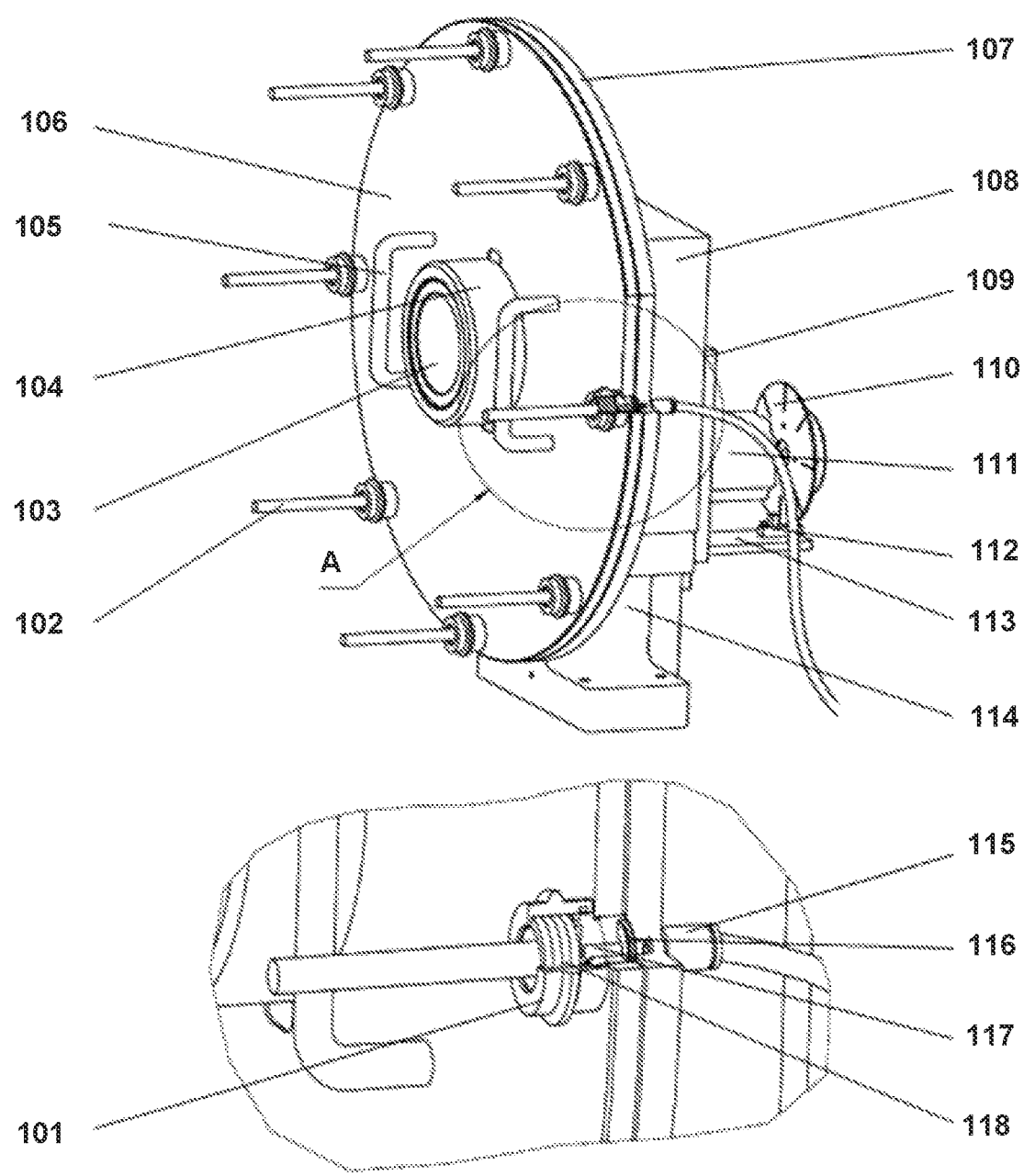
FIG. 3 is a schematic structure view of a multichannel rotary plate unit of the automatic multichannel apparatus for assessing hot coal fallout propensity of burning cigarettes as shown in FIG. 1.

In one embodiment of the present invention, the multichannel rotary plate unit of the automatic multichannel apparatus for assessing hot coal fallout propensity of burning cigarettes is shown in FIG. 3. The rotary plate unit is mainly installed on the main frame 11 by a rotary plate base 114. A transmission seat 108 is installed above the rotary plate base 114, and a rotary plate flange 103 is installed on a rotary surface at one end of the transmission seat 108. The rotary plate 106 is mounted on the rotary plate flange 103 by a flange press knob 104. One end of a securing plate 107 is mounted on a fixed surface of the transmission seat 108, and the other end contacts with Variseals 116 to ensure that the rotary plate 106 can be kept to be sealed during rotation, Each of the Variseals 116 is mounted in an end surface slot of a labyrinth ring connection seat 117. The labyrinth ting connection seats 117 are located on eight uniformly distributed mounting holes of the rotary plate 106. A labyrinth ring sleeve 101 and the labyrinth ring connection seat 117 are connected by a sealing ring, and four labyrinth rings 118 are arranged therebetween to hold cigarette samples 2. A first pneumatic joint 115 is mounted on the securing plate 107. Samples 102 are in communication with the suction unit 8 when the rotary plate 106 drives a sample 102 to move to be concentric with the first pneumatic joint 115. A handle 105 is disposed in a front surface of the rotary plate 106 to facilitate detachment, cleaning and installation of the rotary plate 106. The transmission seat 108 is driven by a stepper motor 111, and a coding plate 110 and a photoelectric switch 113 for positioning the transmission seat are mounted on a support seat 109. The rotary plate 106 rotates by starting the stepper motor 111 and a rotating angle of the stepper motor 111 is controlled by the coding plate 110 and the photoelectric switch 112, so that the cigarette samples 102, the labyrinth ring sleeves 101, the labyrinth rings 118, the labyrinth ring connection seats 117, the Variseals 116 and the first pneumatic joints 115 are concentric to meet detection conditions of cigarette samples 102 held in multiple sample holes.

In an embodiment of the present invention, a hot coal fallout detection unit of the automatic multichannel apparatus for assessing hot coal fallout propensity of burning cigarettes is shown in FIG. 4. The hot coal fallout detection unit is installed on a cigarette pull cylinder installation seat 203 mainly by two same linear bearings 202. A guide shaft 201 is installed between the two linear bearings 202, and a cigarette pull cylinder 204 is arranged between the two same linear bearings 202. The cigarette pull cylinder 204 is mounted on the cigarette pull cylinder installation seat 203. The guide shaft 201 and the cigarette pull cylinder 204 are mounted at one end of a cigarette pull pneumatic finger connection plate 205, and the other end of the cigarette pull pneumatic finger connection plate 205 is connected with a cigarette pull pneumatic finger 207. A cigarette pull claw 206 is provided below the cigarette pull pneumatic finger 207. An adapter 208 is arranged on a right upper side of a hot coal fallout unit installation base 213. A hot coal fallout detection temperature sensor 211 is installed inside the adapter 208, and a front end thereof is concentric with a probe guide tube 209. The probe guide tube 209 and a probe seat 212 are connected by a probe connection gong sleeve 210. A surface temperature of the sample is detected by the hot coal fallout detection temperature sensor 211, so that the cigarette pull cylinder 204 drives the cigarette pull pneumatic finger connection plate 205 to move back and forth and stability of the movement of the cigarette pull pneumatic finger connection plate is maintained to be stable by the guide shaft 201. After the cigarette pull cylinder 204 reaches to a specified position, the cigarette pull pneumatic finger 207 is started and drives the cigarette pull claw 206 to remove or correct the sample.

In an embodiment, an automatic supplying unit for cigarette samples of the automatic multichannel apparatus for assessing hot coal fallout propensity of burning cigarettes is shown in FIG. 5, FIG. 12 and FIG. 13. The automatic supplying unit for cigarette samples may be mainly composed of a cigarette supplying module and a cigarette pushing module, which are installed on a cigarette loading base 301. The cigarette supplying module may be mainly composed of a roller motor 310, a motor bracket 311, a rear bracket 312 of a cigarette collection box, a roller 313, a cigarette sliding slot 314, a cigarette collection box 315, a correlation photoelectric switch a 316, a front bracket 317 of the cigarette collection box, a sample bracket 322, a correlation photoelectric switch b 331, a cigarette supplying guide plate 330, a roller photoelectric switch 329, a coding plate 328 of a cigarette loading roller, and a roller coupler 324. The cigarette supplying module mainly functions to supply a cigarette 321 from inside of the cigarette collection box 315 into the cigarette sliding slot 314. The cigarette sample 321 is placed inside the cigarette collection box 315. The cigarette collection box 315 is fixed on the front bracket 317 and the rear bracket 312 of the cigarette collection box, and the roller 313 is disposed between the front bracket 317 and the rear bracket 312. The coding plate 328 of the cigarette loading roller is installed on a rear end of the roller 313. One end of the roller coupler 324 is linked to the coding plate 328 of the cigarette loading roller, and the other end thereof is linked to the roller motor 310. The roller motor 310 is mounted on the roller motor bracket 311. The roller motor bracket 311 is fixed on the rear bracket 312 of the cigarette collection box, and the roller photoelectric switch 329 is mounted below the roller motor bracket. The cigarette supplying guide plate 330 is located below the roller 313 and is mounted between the front bracket 317 and the rear bracket 312 of the cigarette collection box. The cigarette sliding slot 314 is disposed below the cigarette supplying guide plate 330 and is mounted on the cigarette supplying base 309. The correlation photoelectric switch b 331 is disposed on backside of the cigarette supplying guide plate 330, and the correlation photoelectric switch a 316 is located directly opposite to the correlation photoelectric switch b 331. The correlation photoelectric switch a 316 and the correlation photoelectric switch b 331 are used to detect whether the cigarette enters into the cigarette sliding slot 314. The cigarette pushing module is mainly composed of a cigarette pushing motor 309, a motor installation seat 308, a coupler 307, a cigarette pushing baffle installation seat 306, a bearing base 305, a cigarette pushing photoelectric switch 304, a cigarette pushing lead screw platform installation seat 303, a cylinder installation seat 302, a claw cylinder 318, a claw installation seat 319, a cigarette loading claw 320, a transverse cylinder 323, a pushing rod 327, a cigarette pushing lead screw platform 326, and a cigarette pushing baffle 325. The pushing rod 327 is located above the cigarette sliding slot 314. One end of the cigarette pushing baffle 325 is mounted on the cigarette pushing baffle installation seat 306 and the other end thereof is provided with the pushing rod 327. A lower part of the cigarette pushing lead screw platform 326 is fixed to and linked with the installation seat 303, and a upper part thereof is fixed to and linked with the cigarette pushing baffle installation seat 306. The cigarette pushing motor 309 is located behind the cigarette pushing baffle installation seat 306 and is installed on the motor installation seat 308. The bearing base 305 is positioned directly in front of the motor installation seat 308 and is fixed to and located above the cigarette pushing lead screw platform installation seat 303. The coupler 307 is mounted between the bearing base 305 and the motor installation seat 308. One end of the coupler 307 is linked to the cigarette pushing motor 309, and the other end thereof is linked to the cigarette pushing lead screw platform 326. The transverse cylinder 323 is located on the right side of the cigarette pushing lead screw platform 326 and the other end thereof is fixed to and linked with the cylinder installation seat 302. The cylinder installation seat 302 is mounted on the cigarette loading base 301. The claw installation seat 319 is mounted in front of the transverse cylinder 323. The claw cylinder 318 is mounted on the claw installation seat 319, and the other end thereof is provided with the cigarette loading claw 320. The cigarette pushing photoelectric switch 304 is mounted on the cigarette pushing lead screw platform installation seat 303 and is located at the right front side of the bearing base 305. The roller 313 rotates via transmission of the roller coupler 324 by starting the roller motor 310. The sample 321 then passes through the cigarette supplying guide plate 330, and is determined to be fell into the cigarette sliding slot 314 by the correlation photoelectric switch a 316 and the correlation photoelectric switch b 331. After that, the cigarette pushing motor 309 is started and drives the coupler 307 to rotate, thereby driving the cigarette pushing lead screw platform 326 to move back and forth so as to move the cigarette pushing baffle installation seat 306, the cigarette pushing baffle 325, the pushing rod 327 back and forth. Accordingly, the sample 321 is pushed onto the sample bracket 322. The claw cylinder 318 drives the cigarette loading claw 320 to hold the sample 321 tightly. The claw installation seat 319 moves back and forth by the transverse cylinder 323, so as to move the sample 321 to a fixed position and then open the cigarette loading claw 320 and back to the original position.

In an embodiment of the present invention, an automatic ignition and burning line detection unit for cigarette samples of the automatic multichannel apparatus for assessing hot coal fallout propensity of burning cigarettes is shown in FIG. 6. The automatic ignition and burning line detection unit 4 for cigarette samples may include a burning line detection adapter 401, a burning line detection temperature sensor 402 fixed inside the burning line detection adapter 401, and a burning line detection adapter cover 403 fixed with the burning line detection adapter 401 to protect the burning line detection temperature sensor 402. A probe shaft 421 is fixed on the burning line detection adapter 401. The probe piece 422 is fixed at an end of the probe shaft 421. The probe shaft 421 and the probe piece 422 ensure that measured burning temperatures are in the same level to ensure accuracy of the burning line test. The burning line detection adapter 401 is fixed on a movable platform (a burning line detection movable platform) 419. The left and right movement of the burning line detection unit and detection of different positions of the burning line can be achieved by manually moving the platform. The burning line detection movable table 419 is fixed on an ignition unit bottom plate 404. An igniter head 418 is connected with an igniter rod 415 through an igniter fixing sleeve 417. An igniter handle 414 is fixed at a tail end of the igniter rod 415. An igniter is clamped by an upper igniter support seat 416 and a lower igniter support seat 406. The lower igniter support seat 406 is fixed on an igniter electric platform 409, which is fixed on a lateral securing seat 408 of the ignition unit. A platform driving motor 412 is fixed on a motor flange 411, and is connected with the igniter electric platform 409 by a coupler 413. The motor flange 411 is fixed on a flange connection plate 410 The platform driving motor 412 drives the igniter electric platform 409 to move so as to drive the igniter to move toward an end of the cigarette, thereby achieving automatic ignition function. An igniter photoelectric switch baffle 407 is fixed on a slider of the igniter electric platform 409. Two photoelectric switches 405 for detecting hot coal fallout are fixed on a lateral securing seat 408 of the ignition unit and respectively located on left side and on right side, so as to ensure front and rear position limitation of the lead screw during the movement while the initial position of the ignition electric platform 409 is determined.

In an embodiment of the present invention, a holding and flicking unit of the automatic multichannel apparatus for assessing hot coal fallout propensity of burning cigarettes is shown in FIG. 7. The holding and flicking unit 5 may include a flicking head 501 fixed on a flicking sheet 502. The flicking sheet 502 is fixed to a flicking sheet installation seat 520. The flicking sheet installation seat 520 is fixed on a cylinder shaft of a rotary cylinder 506. The rotary cylinder 506 rotates to drive a flicking claw installation seat 503, the flicking sheet 502 and the flicking head 501 to move together, so as to achieve a depressing action of the flicking head 501. The rotary cylinder seat 505 is fixed on a pneumatic sliding table 519 of a flicking module that drives the rotary cylinder seat 505 to move back. The flicking action on the sample is performed by cooperating with the depressing action of the flicking head 501. An upper vibration-damping sheet 504 is fixed on an upper half portion of the rotary cylinder installation seat 505 and functions to limit the position and stop the vibration to the flicking head 502 during the upward flicking process. A lower vibration-damping sheet 521 is fixed on a lower half portion of the rotary cylinder installation seat 505 and functions to limit the position and stop the vibration to the flicking head 502 during the downward flicking process. A rotary cylinder 506 is fixed on the rotary cylinder installation seat 505. The pneumatic sliding table 519 of the flicking module is fixed on a flicking module installation seat 518 that is fixed on a lead screw sliding table 515 of the flicking module. The flicking module installation seat 518 is driven by the lead screw sliding table 515 of the flicking module and thus moves, thereby achieving required different flicking positions. The lead screw sliding table 515 of the flicking module is fixed on a motor sliding table installation plate 511. A null photoelectric switch 516 is fixed on the motor sliding table installation plate 511. A null switch baffle 517 is fixed on the flicking module installation seat 518. The null switch baffle 517 is detected by the null photoelectric switch 516 to determine the stroke of the flicking module installation seat 518. An upper flicking claw 525 is fixed on an upper jaw of a cigarette flicking pneumatic claw 522. A lower flicking claw seat 523 is fixed on a lower jaw of the cigarette flicking pneumatic claw 522, and a lower flicking claw 524 is fixed on the lower flicking claw seat 523. The cigarette flicking pneumatic claw 522 drives the upper flicking claw 525, the lower flicking claw seat 523 and the lower flicking claw 524 to act, so as to clamp the sample tightly to ensure that the sample does not fall down during the flicking process. The cigarette flicking pneumatic claw 522 is fixed on the flicking claw installation seat 503 that is fixed on the cigarette flicking claw support seat 507. The cigarette flicking claw support seat 507 is fixed on a one-dimensional motor platform 512 of a holding module. The cigarette flicking claw support seat 507 is driven by the one-dimensional motor platform 512 of the holding module and thus moves, thereby achieving required different holding positions. The one-dimensional motor platform 512 of the holding module is fixed on a motor sliding table base 510, which is fixed on the motor sliding table installation plate 511. A claw limit baffle 508 is fixed on the cigarette flicking claw support seat 507, and a limit photoelectric switch 509 is fixed on the motor sliding table base 510. The stroke of the cigarette flicking claw support seat 507 is determined by detecting the claw limit baffle 508 via the limit photoelectric switch 509.

The motor sliding table installation plate 511 is fixed on a pneumatic sliding table 514 of a flicking assembly. The pneumatic sliding table 514 of the flicking assembly is fixed on a flicking assembly base 513. The overall movement of the flicking unit is achieved by moving the motor sliding table installation plate 511 via driving of the pneumatic sliding table 514 of the flicking assembly.

In an embodiment of the present invention, the automatic multichannel apparatus for assessing hot coal fallout propensity of burning cigarettes may further include a trap unit 6. FIGS. 8 and 14 show a schematic structure view of the trap unit. The trap unit 6 may mainly include a pressing rod installation seat 607, which is fixed on a compression cylinder bracket 606. The compression cylinder bracket 606 is fixed on a smoke collecting unit installation seat 601 by a corner element 602. A trap compression cylinder 608 is fixed on the pressing rod installation seat 607. A trap pressing opening 609 is fixed at an end of the trap compression cylinder 608. A rear end of a pneumatic joint 610 fixed on the trap compression cylinder 608 is connected with the first pneumatic joint 115 of the multichannel rotary plate unit 1. A trap adapter 614 is directly fixed on the smoke collecting unit installation seat 601. A trap tray 603 is fixed on a smoke collecting unit installation seat 601 by three standard shaft rods 604. A gas discharge joint 615 is fixed on the smoke collecting unit installation seat 607. The other end of the gas discharge joint 615 is connected to a suction unit 9. A filter seat 611 is placed inside the trap tray 603. A filter 613 is placed inside a filter seat 611. A filter cover 612 is fixed inside the filter seat 611 by a filter clip triangle clip 605. The trap compression cylinder 608 drives the trap pressing opening 609 to move downwards to a surface of the filter cover 612, thereby forming a closed cavity along with the filter seat 611, the filter 613 and the trap adapter 614. When the suction unit 8 performs a suction operation, the trap unit 6 may filter impurities in the smoking gas to ensure clean interior of the suction unit 8, so as to use the suction unit efficiently for a long time.

In an embodiment of the present invention, the suction unit of the automatic multichannel apparatus for assessing hot coal fallout propensity of burning cigarettes is shown in FIG. 9. The suction unit may include a slide rail and slide rail seat 802, and a transition block 803 disposed on the slide rail seat 802. A movable block 804 is installed on the transition block 803 and connected with a motor shaft 805. A suction piston 812 is driven by a suction motor 808 to move so as to perform a suction action. The suction motor 808 is installed on a suction motor bracket 807. A motor connection plate 809 is installed on the suction motor 808. A piston glass tube 811 is connected with the motor connection plate 809 and a suction cylinder base 814. The motor connection plate 809 and the suction cylinder base 814 are fastened by using a tension rod 810 and an adjustable cylinder nut 815. A suction null photoelectric switch 806 is fixed on a suction unit installation seat 801. The suction unit installation seat 801 and the suction motor bracket 807 are fixed on a support rod 816 of the suction unit.

A structure of a control unit of the automatic multichannel apparatus for assessing hot coal fallout propensity detection device is described below with reference to FIG. 11. A host computer and a programmable controller may send instructions to a solenoid valve(s) by time series, and a pneumatic executor is controlled by the solenoid valve to perform related operation. In addition, the host computer and the programmable controller may send instructions to the motor. The motor controls an electric executor to perform related operation, and the photoelectric switch controls the initial position of the electric executor. An infrared detector may detect hot coal fallout condition of the burning line and the cigarette sample and determine whether to perform stop operation or sample removing operation. The control unit may be mainly composed of the host computer, the programmable controller, multiple groups of a throttle valve, a solenoid valve and a pneumatic executor, and multiple groups of an electronic control executor and a photoelectric switch. The control unit may perform as described below: the host computer of the control unit controls operation of the entire detection device, the programmable controller is connected with the throttle valves, the solenoid valves and the rotary cylinder arranged in the cigarette holding and force applying unit to apply a rotational operation on the flicking sheet; the programmable controller is connected with the throttling valves, the solenoid vales and the cylinder arranged in the cigarette holding and force applying unit to apply a translational operation on the pneumatic sliding table; the programmable controller is connected with the solenoid valves, and the flicking module pneumatic sliding table arranged in the cigarette holding and force applying unit to apply a translational operation on the flicking device; the programmable controller is connected with the solenoid valves and the claw cylinder arranged in the automatic supplying unit for cigarette samples to perform a holding operation; the programmable controller is connected with the solenoid valves and sample removal pneumatic fingers arranged in the multichannel rotary plate unit to perform sample removal operation; the programmable controller is connected with the solenoid valves and a hot coal fallout detection cylinder arranged in the multichannel rotary plate unit to perform a moving operation of the sample removal pneumatic fingers, and all of the above throttle valves are used for adjusting cylinder moving speed; the programmable controller is connected with the electronic executor and the photoelectric switch arranged in the cigarette holding and force applying unit to control a flicking force applying position; the programmable controller is connected with the electronic executor and the photoelectric switch arranged in the cigarette sample automatic ignition and burning line detection unit to control movement of the igniter head; the programmable controller is connected with the cigarette pushing motor and the photoelectric switch arranged in the automatic supplying unit for cigarette samples to control movement of the pushing rod; the programmable controller is connected with the roller motor and the photoelectric switch arranged in the automatic supplying unit for cigarette samples to control rotational sampling of the roller; the programmable controller is connected with the stepper motor and the photoelectric switch arranged in the multichannel rotary plate unit to control rotation of the rotary plate. Meanwhile, the host computer in the control unit may control a pressure regulating valve so as to control a total pneumatic pressure.

FIG. 10 illustrates a testing flowchart of the detection device. The detection device is turned on and initialized. The automatic supplying unit 3 for cigarette samples performs a cigarette loading action. The rotary plate 1 rotates and is determined whether the rotary plate has rotated N times. If the determination result is NO, the automatic supplying unit 3 for cigarette samples continues to perform the cigarette loading action, and the rotary plate 1 next rotates one turn and then performs the determination step again. Otherwise, the igniter unit 4 and the suction unit 8 may operate. The rotary plate 1 rotates after completing a cigarette ignition operation, and at this time, it is determined whether the rotary plate has rotated N times or not. If the determination result is NO, the igniter unit 4 and the suction unit 8 continue to perform the ignition operation, and then the rotary plate 1 rotates one turn and the determination step is then performed again. Otherwise, the holding and flicking unit 5 may operate. After completing a cigarette flicking action, the hot coal fallout detection unit 2 may operate to determine whether hot coal fallout occurs after flicking. If the determination result is YES, the cigarette pull claw functions to put the cigarette into the ash hopper 7. Otherwise, the next step is performed, that is, the burning line detection unit 4 may operate to determine whether the cigarette reaches the burning line. If the determination result is YES, the cigarette pull claw functions to put the cigarette into the ash hopper 7. Otherwise, the holding and flicking unit 5, the hot coal fallout detection unit 2, the suction unit 8 and the burning line detection unit 4 may operate repeatedly in turn.

What is claimed is:

1. An automatic multichannel apparatus for assessing hot coal fallout propensity of burning cigarettes, comprising: a main frame, a control unit, and a multichannel rotary plate unit, an automatic supplying unit for cigarette samples, an automatic ignition and burning line detection unit for cigarette samples, a suction unit, a cigarette holding and force applying unit and an automatic hot coal fallout detection and removal unit, which are disposed inside the main frame and connected with the control unit respectively, wherein:
   the multichannel rotary plate unit has a plurality of sample insertion holes for holding cigarettes;
   the automatic supplying unit for cigarette samples is connected with the multichannel rotary plate unit and disposed on an enter side of the plurality of sample insertion holes so as to load a cigarette to one of the plurality of sample insertion holes;
   the automatic ignition and burning line detection unit for cigarette samples is disposed on an exit side of the plurality of sample insertion holes and located closer to the plurality of sample insertion holes, to ignite the cigarette samples each held in relative one of the plurality of sample insertion holes and detect the burning line of the cigarette samples;
   the suction unit is connected with one of the plurality of sample insertion holes to simulate a cigarette smoking action after igniting the cigarette;
   the cigarette holding and force applying unit is disposed closer to the enter side of the plurality of sample insertion holes to simulate cigarette holding and flicking actions; and
   the automatic hot coal fallout detection and removal unit is disposed closer to one of the plurality of sample insertion holes to detect whether the cigarette has hot coal fallout and remove the cigarette from a channel.

2. The apparatus according to claim 1, wherein the multichannel rotary plate unit comprises:
   a transmission seat base disposed inside the main frame;
   a transmission seat vertically disposed on the transmission seat base and connected with a rotation driving device;
   a rotary plate disposed on a rotary surface of the transmission seat and including the plurality of sample insertion holes;
   a securing plate disposed on a securing surface of the transmission seat, and a sealing device being provided between the securing plate and the rotary plate; and
   a first pneumatic joint disposed on the securing plate and connected with the suction unit, and the first pneumatic joint being capable of be in communication with one of the plurality of sample insertion holes so as to suck the cigarette held in the one of the plurality of sample insertion holes to perform suction.

3. The apparatus according to claim 2, wherein the rotary surface of the transmission seat is provided with a rotary plate flange that is mounted on the rotary plate flange by pressing a knob.

4. The apparatus according to claim 2, wherein the rotary plate is sealed with the securing plate by a Variseal.

5. The apparatus according to claim 2, wherein each of the plurality of sample insertion holes comprises:
   a labyrinth ring connection seat, the sealing device between the rotary plate and the securing plate being disposed at one end of the labyrinth ring connection seat closer to the securing plate;
   a labyrinth ring sleeve disposed at another end of the labyrinth ring connection seat away from the securing plate via the sealing device; and
   a plurality of labyrinth rings disposed inside the labyrinth ring sleeve to hold cigarette samples.

6. The apparatus according to claim 5, wherein the plurality of labyrinth rings include four labyrinth rings.

7. The apparatus according to claim 2, wherein at least two handles are disposed on one side of the rotary plate facing away from the securing plate.

8. The apparatus according to claim 1, wherein the automatic supplying unit for cigarette samples comprises a cigarette supplying module and a cigarette pushing module connected to the cigarette supplying module by a cigarette sliding slot, and the cigarette supplying module and the cigarette pushing module are both mounted on the main body by a cigarette loading base, wherein the cigarette supplying module is configured to supply a cigarette into the cigarette sliding slot, and the cigarette pushing module pushes the cigarette within the cigarette sliding slot into one of the plurality of sample insertion holes.

9. The apparatus according to claim 8, wherein the cigarette supplying module comprises:
   a cigarette collection box mounted on the cigarette loading base by a cigarette collection box bracket to contain the cigarette; and
   a roller disposed at an exit end of the cigarette collection box and connected with the cigarette sliding slot, so as to supply the cigarette within the cigarette collection box into the cigarette sliding slot under drive of a roller driving device.

10. The apparatus according to claim 9, wherein the cigarette supplying module further comprises a cigarette supplying guide plate disposed on a lower side of the roller and overlapped with the cigarette sliding slot, so as to guide the cigarette to roll from the roller to the cigarette sliding slot.

11. The apparatus according to claim 9, wherein the cigarette supplying module further comprises correlation photoelectric switches, the correlation photoelectric switches are disposed opposite to each other in a direction perpendicular to a length direction of the cigarette sliding slot to detect whether the cigarette is located in the cigarette sliding slot.

12. The apparatus according to claim 9, wherein the cigarette supplying module further comprises:
   a roller photoelectric switch disposed on the cigarette collecting box bracket to determine an initial position of the roller.

13. The apparatus according to claim 9, wherein the cigarette supplying module further comprises a coding plate of a cigarette loading roller and a roller coupler, wherein one end of the roller coupler is connected with the roller driving device and another end thereof is connected to the roller by the coding plate for the cigarette loading roller.

14. The apparatus according to claim 8, wherein the cigarette pushing module comprises:
a sample bracket disposed at one end of the cigarette sliding slot closer to one of the plurality of sample insertion holes;
a pushing rod disposed above the cigarette sliding slot to push the cigarette within the cigarette sliding slot to the sample bracket under action of a pushing rod driving device; and
a cigarette loading claw disposed above the sample bracket and connected with a claw driving device, to clamp the cigarette sample on the sample bracket under drive of the claw driving device and transmit the cigarette sample to one of the plurality of sample insertion holes.

15. The apparatus according to claim 14, wherein the cigarette pushing driving device comprises:
a cigarette pushing motor;
a cigarette pushing lead screw platform connected with the cigarette pushing motor by a coupler; and
a cigarette pushing baffle installed on the cigarette pushing lead screw platform and connected with one end of the pushing rod.

16. The apparatus according to claim 15, wherein the cigarette pushing module further comprises a cigarette pushing photoelectric switch disposed on a cigarette pushing lead screw platform installation seat to determine an initial position of the pushing rod.

17. The apparatus according to claim 14, wherein the claw driving device comprises:
a transverse cylinder disposed in parallel with the cigarette pushing lead screw platform;
a claw cylinder mounted at a piston end of the transverse cylinder by a claw cylinder installation seat; and
the cigarette loading claw connected with the claw cylinder to clamp the cigarette held on the sample bracket.

18. The apparatus according to claim 1, wherein the automatic ignition and burning line detection unit for cigarette samples comprises:
an igniter disposed closer to one of the plurality of sample insertion holes to ignite the cigarette sample held within the one of the plurality of sample insertion holes;
an igniter electric platform installed on a base of the automatic ignition and burning line detection unit for cigarette samples and connected with the igniter to drive the igniter to move under drive of a cigarette ignition electric platform driving device; and
a burning line detection device disposed on an ignition base closer to one of the plurality of sample insertion holes, to detect a burning line of the cigarette held within the one of the plurality of sample insertion holes.

19. The apparatus according to claim 18, wherein the burning line detection device comprises:
a burning line detection movable platform disposed on the base of the automatic ignition and burning line detection unit for cigarette samples, the burning line detection movable platform being capable of moving;
a probe shaft disposed on a burning line detection adaptor closer to one of the plurality of sample insertion holes; and
a burning line detection temperature sensor installed inside the burning line detection line detection adaptor.

20. The apparatus according to claim 19, wherein an end of the probe shaft has a probe piece.

21. The apparatus according to claim 19, wherein an axis of the probe shaft and an axis of the igniter are located in the same plane and perpendicular to each other.

22. The apparatus according to claim 18, wherein the igniter includes an igniter head, an igniter rod and an igniter handle, wherein the igniter head is disposed at one end of the igniter rod by an igniter fixing sleeve, the igniter handle is disposed at the other end of the igniter rod, and the igniter rod is connected with the igniter electric platform to move under drive of the igniter electric platform.

23. The apparatus according to claim 22, wherein the automatic ignition and burning line detection unit for cigarette samples further comprises:
an upper igniter support seat and a lower igniter support seat cooperated with the upper igniter support seat, wherein the igniter rod is held between the upper igniter support seat and the lower igniter support seat, and the lower igniter support seat is connected with the igniter electric platform.

24. The apparatus according to claim 18, wherein the igniter electric platform driving device includes a platform driving motor connected to the igniter electric platform by a coupler.

25. The apparatus according to claim 18, wherein the automatic ignition and burning line detection unit for cigarette samples further comprises:
two ignition photoelectric switches oppositely disposed on an installation seat of the automatic ignition and burning line detecting unit for cigarette samples; and
an igniter photoelectric switch baffle disposed on a slider located on the igniter electric platform,
wherein, an initial position of the igniter electric platform is a position, to which the igniter photoelectric switch baffle moves between the two igniter photoelectric switches.

26. The apparatus according to claim 1, wherein the suction unit comprises:
a suction unit installation seat disposed on a vertical support in the main frame;
a slide rail disposed on the suction unit installation seat along a length direction of the suction unit installation seat;
a suction motor, wherein a motor shaft of the suction motor is connected with a slider on the slide rail; and
a suction cylinder, wherein one end of the suction cylinder is connected with the suction motor by a motor connection plate and the other end thereof is closed by a cover, a suction piston is disposed in the suction cylinder and an end face of the suction piston is the same as a radial section of the suction cylinder, and the cover is provided with an opening to be connected with a suction air pipe, and the suction air pipe is connected with one of the plurality of sample insertion holes.

27. The apparatus according to claim 26, wherein the suction unit further comprises:
a suction motor bracket connected with the vertical support to fix the suction motor;
a suction cylinder base disposed at a bottom of the suction cylinder to support the suction cylinder; and
a tension rod, both ends of the tensioning rod being respectively connected with the suction motor bracket and the suction cylinder base.

28. The apparatus according to claim 26, wherein the suction cylinder is a cylindrical glass cylinder with openings at both ends.

29. The apparatus according to claim 26, wherein the suction unit further comprises a suction null photoelectric switch that is disposed on the suction unit installation seat and connected with the control unit, to determine an initial position of the suction motor.

30. The apparatus according to claim 1, wherein the cigarette holding and force applying unit comprises a flicking module and a holding module, wherein:
the flicking module includes:
a flicking sheet;
a rotary cylinder, a cylinder shaft of the rotary cylinder being connected with one end of the flicking sheet to drive the flicking sheet to rotate upwardly and downwardly; and
a pneumatic sliding table of the flicking module disposed on the base of the cigarette holding and force applying unit, and one end of the pneumatic sliding table of the flicking module being connected with the rotary cylinder to drive the flicking sheet to move horizontally, and
the holding module includes:
a flicking claw;
a one-dimensional motor platform disposed on the pneumatic sliding table of the flicking module by a motor sliding table installation plate, and the one-dimensional motor platform is connected with the flicking claw to drive action of the flicking claw.

31. The apparatus according to claim 30, wherein one end of the flicking sheet for flicking the cigarette is provided with a flicking head having a larger sectional area than a wide of the flicking sheet to increase a flicking area.

32. The apparatus according to claim 30, wherein the flicking sheet is mounted on the rotary cylinder by a flicking sheet installation seat, and the rotary cylinder is mounted on the pneumatic sliding table of the flicking module by a rotary cylinder installation seat,
wherein the flicking module further includes an upper vibration-damping sheet mounted on the flicking sheet installation seat and a lower vibration-damping sheet mounted on the rotary cylinder installation seat to limit a range, in which the flicking sheet rotates up and down.

33. The apparatus according to claim 30, wherein the flicking module further comprises:
a lead screw sliding table of the flicking module disposed on the pneumatic sliding table of the flicking assembly, and the pneumatic sliding table of the flicking module is disposed on the lead screw sliding table of the flicking module to install the rotary cylinder.

34. The apparatus according to claim 33, where the flicking module further comprises:
a null photoelectric switch disposed on the motor sliding stable installation plate and connected with the control unit; and
a null switch baffle disposed on the base of the cigarette holding and force applying unit, wherein a position of the null switch baffle is detected by the null photoelectric switch to determine stroke of the base of the cigarette holding and force applying unit.

35. The apparatus according to claim 30, wherein the flicking claw comprises:
a cigarette flicking pneumatic claw connected with the one-dimensional motor platform;
an upper flicking claw mounted on an upper jaw of the cigarette flicking pneumatic claw; and
a lower flicking claw mounted on a lower jaw of the cigarette flicking pneumatic claw by a lower jaw installation seat.

36. The apparatus according to claim 35, wherein the holding module further comprises:
a cigarette flicking claw support seat mounted on the one-dimensional motor platform and mounted on the cigarette flicking claw support seat by one end of a flicking claw installation seat;
a claw limit baffle mounted on the cigarette flicking claw support seat; and
a limit photoelectric switch mounted on a motor sliding table base, the motor sliding table base being disposed on the motor sliding table installation plate to mount the one-dimensional motor platform, and the limit photoelectric switch being capable of detecting a stroke of the claw limit baffle to determine a stroke of the cigarette flicking claw support seat.

37. The apparatus according to claim 1, wherein the automatic hot coal fallout detection and removal unit comprises:
a hot coal fallout unit base connected with the main frame;
a hot coal fallout detection temperature sensor disposed inside the hot coal fallout unit base by an adapter and connected with the control unit to detect a temperature of a burning end of the cigarette and transmit the temperature data to the control unit, so that the control unit determines whether hot coal fallout of the cigarette occurs;
a cigarette pull cylinder mounted on the hot coal fallout unit base by a cigarette pull cylinder installation seat;
a pneumatic finger connection plate, one end of the pneumatic finger connection plate being connected with the cigarette pull cylinder installation seat; and
a cigarette pull claw disposed at the other end of the pneumatic finger connection plate to move under drive of the cigarette pull cylinder and pull out the cigarette from one of the plurality of sample insertion holes.

38. The apparatus according to claim 37, wherein the automatic hot coal fallout detection and removal unit further comprises at least one linear bearing disposed on the cigarette pull cylinder installation seat, and a guide shaft positioned in parallel to a direction of pulling the cigarette is provided in the at least one linear bearing.

39. The apparatus according to claim 37, wherein the at least one linear bearing comprises two linear bearings.

40. The apparatus according to claim 37, wherein the automatic hot coal fallout detection and removal unit further comprises:
a probe guide tube mounted on the adapter by a probe seat and being coaxial with a probe head of the hot coal fallout detection temperature sensor, the probe guide tube facing one of the plurality of sample insertion holes so that the hot coal fallout detection temperature sensor is capable of receiving burning temperature of a cigarettes sample held in the one of the plurality of sample insertion holes.

41. The apparatus according to claim 37, wherein the hot coal fallout detection temperature sensor is an infrared temperature sensor.

42. The apparatus according to claim 37, wherein the automatic hot coal fallout detection and removal unit further comprises a cigarette pull pneumatic finger connected with the cigarette pull claw to perform grasping and releasing actions of the cigarette pull claw.

43. The apparatus according to claim 1, further comprising a smoke collecting unit, said smoke collecting unit comprising:
a gas filtering device disposed in the main frame by a smoke collecting unit installation sat and including a second pneumatic joint and a gas discharge joint, wherein the second pneumatic joint communicates with one of the plurality of sample insertion holes, and the gas discharge joint communicates with the suction unit.

44. The apparatus according to claim 43, wherein the gas filtering device further comprises:
a compression cylinder mounted on the smoke collecting unit installation seat;
a pressing opening disposed at a piston end of the compression cylinder, and the second pneumatic joint being in communication with the pressing opening to transfer the suction gas through the pressing opening; and
a filter plate, an upper end of the filter plate being in communication with the pressing opening and a lower end of the filter plate being in communication with the gas discharge joint, so as to filter the suction gas and transfer the filtered gas to the suction unit.

45. The apparatus according to claim 44, wherein the filter plate comprises:
a trap tray disposed on the smoke collecting unit by a shaft rod;
a filter disposed inside the trap tray;
a triangle clip disposed above the filter to compress the filter inside the trap tray, and the pressing opening being disposed above the triangle clip to compress the triangle clip under action of the compression cylinder; and
a trap adaptor in communication with a bottom of the trap tray and the gas discharge joint, respectively, to transfer the filtered gas to the gas discharge joint.

46. The apparatus according claim 45, wherein the filter further comprises:
a filter seat disposed in the trap tray to accommodate the filter, and a plurality of through holes being provided at a bottom of the filter seat to permit gas flow; and
a filter cover fitted with the filter seat to seal the filter, and a top portion of the filter cover having a hole for communicating the filter seat with the pressing opening, wherein the triangle clip is disposed on an upper surface of the filter cover.

47. The apparatus according claim 1, further comprising an ash hopper disposed below the multichannel rotary plate unit to collect ash of burning cigarettes and the remaining portion of the cigarettes.

48. The apparatus according to claim 1, further comprising a smoke exhaust unit having one end connected with the main frame and another end connected with an external smoke collecting device to discharge smoke within the main frame.

49. A method for assessing hot coal fallout propensity of burning cigarettes by using the apparatus according to claim 1, the method comprising:
step A: starting the automatic supplying unit for cigarette samples to supply a cigarette to each of the plurality of sample insertion holes;
step B: starting the automatic ignition and burning line detection unit for cigarette samples to ignite the cigarette held in each of the plurality of sample insertion holes while starting the suction unit to simulate smoking action on the cigarette;
step C: starting the cigarette holding and force applying unit to simulate flicking action on the cigarette held within each of the plurality of sample insertion holes;
step D: starting the automatic hot coal fallout detection and removal unit to detect whether hot coal fallout occurs and using the automatic ignition and burning line detection unit for cigarette samples to detect whether the burning cigarette has reached to a predetermined burning line; and
step E: pulling out the cigarette from the channel, in which the cigarette is held, by the automatic hot coal fallout detection and removal unit, when the cigarette having hot coal fallout or burning to said predetermined burning line is detected.

50. The method according to claim 49, wherein said step A comprises:
step A1: supplying the cigarette to one of the plurality of sample insertion holes by the automatic supplying unit for cigarette samples;
step A2: rotating the multichannel rotary plate unit and repeating the step A to supply a cigarette to another hole adjacent the one hole completing cigarette supplying action; and
step A3: comparing a rotating number n of the multichannel rotary plate unit and a number N of the plurality of sample insertion holes, repeating the step A1 and the step A2 if n<N−1, and performing the step B if n=N.

51. The method according claim 49, wherein said step B comprises:
step B1: starting the automatic ignition and burning line detection unit for cigarette samples to ignite the cigarette held in one channel in communication with the suction unit;
step B2: starting the suction unit to suck the cigarette held in the one channel in communication with the suction unit;
step B3: rotating the multichannel rotary plate unit to allow another channel adjacent to the one channel, in which the ignited cigarette is held, to be in communication with the suction unit and repeating the step B1 and the step B2; and
step B4: comparing the rotating number n of the multichannel rotary plate unit and the number N of the plurality of sample insertion holes, repeating the step B1 and the step B2 if n<N−1, and performing the step C if n=N.

52. The method according to claim 49, wherein the holding unit includes a holding module and a flicking module, the step C comprises:
step C1: starting the holding module to hold the cigarette held in one of the plurality of sample insertion holes; and
step C2: starting the flicking module to flick the held cigarette.

53. The method according claim 49, wherein the automatic hot coal fallout detection and removal unit includes a hot coal fallout unit base and a temperature sensor, said step D comprises:
step D1: staring the temperature sensor to measure a temperature of a burning end of the cigarette and transferring the temperature data to the control unit;
step D2: assessing whether hot coal fallout occurs by the control unit:
turning to said step E if hot coal fallout occurs; and
if hot coal fallout does not occurs, then assessing whether the detected cigarette is burned to a predetermined burning line by using the automatic ignition and burning line detection unit for cigarette samples, if the predetermined burning line is reached, then turning into step E, if the predetermined burning line is not reached, then repeating said step D1.

54. The method according claim 53, wherein said step D2 further comprises:

if the burning cigarettes does not occur hot coal fallout, then the suction unit is activated to perform smoking action for the cigarette.

\* \* \* \* \*

UNITED STATES PATENT AND TRADEMARK OFFICE
CERTIFICATE OF CORRECTION

PATENT NO. : 11,796,394 B2
APPLICATION NO. : 16/959095
DATED : October 24, 2023
INVENTOR(S) : Bin Li et al.

It is certified that error appears in the above-identified patent and that said Letters Patent is hereby corrected as shown below:

In the Claims

In Column 28, Line 67, in Claim 43, delete "sat" and insert -- seat --.

In Column 29, Line 32, in Claim 46, before "claim" insert -- to --.

In Column 29, Line 42, in Claim 47, before "claim" insert -- to --.

In Column 29, Line 46, in Claim 48, before "claim" insert -- to --.

In Column 30, Line 22, in Claim 51, before "claim" insert -- to --.

In Column 30, Line 49, in Claim 53, before "claim" insert -- to --.

In Column 30, Line 53, in Claim 53, delete "staring" and insert -- starting --.

In Column 30, Line 66, in Claim 54, before "claim" insert -- to --.

Signed and Sealed this
Twenty-third Day of January, 2024

Katherine Kelly Vidal
*Director of the United States Patent and Trademark Office*